US007167718B2

(12) United States Patent
Hayashi et al.

(10) Patent No.: US 7,167,718 B2
(45) Date of Patent: Jan. 23, 2007

(54) TRANSMISSION POWER CONTROL APPARATUS, TRANSMISSION POWER CONTROL METHOD, AND MOBILE STATION

(75) Inventors: Takahiro Hayashi, Yokosuka (JP); Yoshihiro Ishikawa, Yokosuka (JP); Seizo Onoe, Yokohama (JP); Takehiro Nakamura, Yokosuka (JP); Mikio Iwamura, Zushi (JP); Yoshiaki Ofuji, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 531 days.

(21) Appl. No.: 10/050,861

(22) Filed: Jan. 18, 2002

(65) Prior Publication Data

US 2002/0094835 A1 Jul. 18, 2002

(30) Foreign Application Priority Data

Jan. 18, 2001 (JP) ............................ 2001-010764
Jan. 18, 2001 (JP) ............................ 2001-010765

(51) Int. Cl.
*H04B 7/00* (2006.01)

(52) U.S. Cl. ........................ 455/522; 455/69; 455/335; 455/114; 455/126; 455/127; 455/343; 330/129; 330/134; 330/138; 330/279; 330/284; 370/318

(58) Field of Classification Search ................ 455/522, 455/69, 114, 126, 127, 343; 330/129, 134, 330/138, 279, 284; 370/318
See application file for complete search history.

(56) References Cited

U.S. PATENT DOCUMENTS 5,778,307 A 7/1998 Budnik
6,064,659 A 5/2000 Rohani et al.
6,128,506 A 10/2000 Knutsson et al.
6,374,118 B1 * 4/2002 Toskala et al. ............. 455/522
6,389,088 B1 * 5/2002 Blois et al. ................. 375/355
6,414,946 B1 7/2002 Satou et al.
6,587,672 B1 * 7/2003 Chuah et al. ................. 455/69
6,615,052 B1 * 9/2003 Parmenter ................... 455/522

(Continued)

FOREIGN PATENT DOCUMENTS

EP 0 991 205 4/2000

(Continued)

OTHER PUBLICATIONS

ANSI/TIA/EIA-95-B, XP-002271982, pp. 6-5-6-13 and 6-296-6-300, "TR45 Mobile Station-Base Station Compatibility Standard for Dual-Mode Spread Spectrum Systems", Oct. 31, 1998.

(Continued)

*Primary Examiner*—Quochien B. Vuong
*Assistant Examiner*—Angelica M. Perez
(74) *Attorney, Agent, or Firm*—Oblon, Spivak, McClelland, Maier & Neustadt, P.C.

(57) ABSTRACT

A transmission power control apparatus for a wireless communication apparatus which reduces a power value of a signal input to a power amplifier to the maximum allowable input power value of the power amplifier or below is provided in which the transmission power control apparatus includes: a part for setting a transmission power upper limit value of a call according to a circuit type of the call; and a part for reducing transmission power for the call to the transmission power upper limit value or below.

39 Claims, 22 Drawing Sheets

U.S. PATENT DOCUMENTS

| | | | | |
|---|---|---|---|---|
| 6,804,520 | B1 * | 10/2004 | Johansson et al. .......... | 455/450 |
| 2002/0080734 | A1 | 6/2002 | Satou et al. | |

FOREIGN PATENT DOCUMENTS

| | | |
|---|---|---|
| JP | 9-307499 | 11/1997 |
| JP | 11-234203 | 8/1999 |

OTHER PUBLICATIONS

M. P. J. Baker, et al., 3G Mobile Communication Technologies, Conference Publication, No. 471, XP-000900538, pp. 36-40, “Power Control in UMTS Release ’99”, 1999.

* cited by examiner

WIRELESS NETWORK CONTROL STATION
1
CONNECTION BY CABLE
BASE STATION
2
CONNECTION BY WIRELESS
MOBILE STATION
4
3

WIRELESS NETWORK CONTROL STATION
CALL ACCEPT PROCESSING PART
103
CALL ESTABLISHING PART
104
107
DATA FOR CALL 1
DATA FOR CALL 2
DATA FOR CALL N
BASEBAND SIGNAL PROCESSING PART
101
TRANSMISSION POWER CONTROL PART
102
BASEBAND SIGNAL MULTIPLEXING/ REDUCING PART
105
POWER AMPLIFIER
106
100

WIRELESS NETWORK CONTROL STATION
1106
OVER-INPUT REDUCING CONTROL PART
TPC COMMAND (UL)
USER DATA
CALL 1
CALL 2
CALL N
1101
BASEBAND SIGNAL PROCESSING PART
1102
TRANSMISSION POWER CONTROL PART
1103
DISTRIBUTOR
1104
BASEBAND SIGNAL MULTIPLEXING PART
1105
OVER-INPUT REDUCING PART
1107
MULTIPLEXING PART
1108
POWER AMPLIFIER
1109
1100

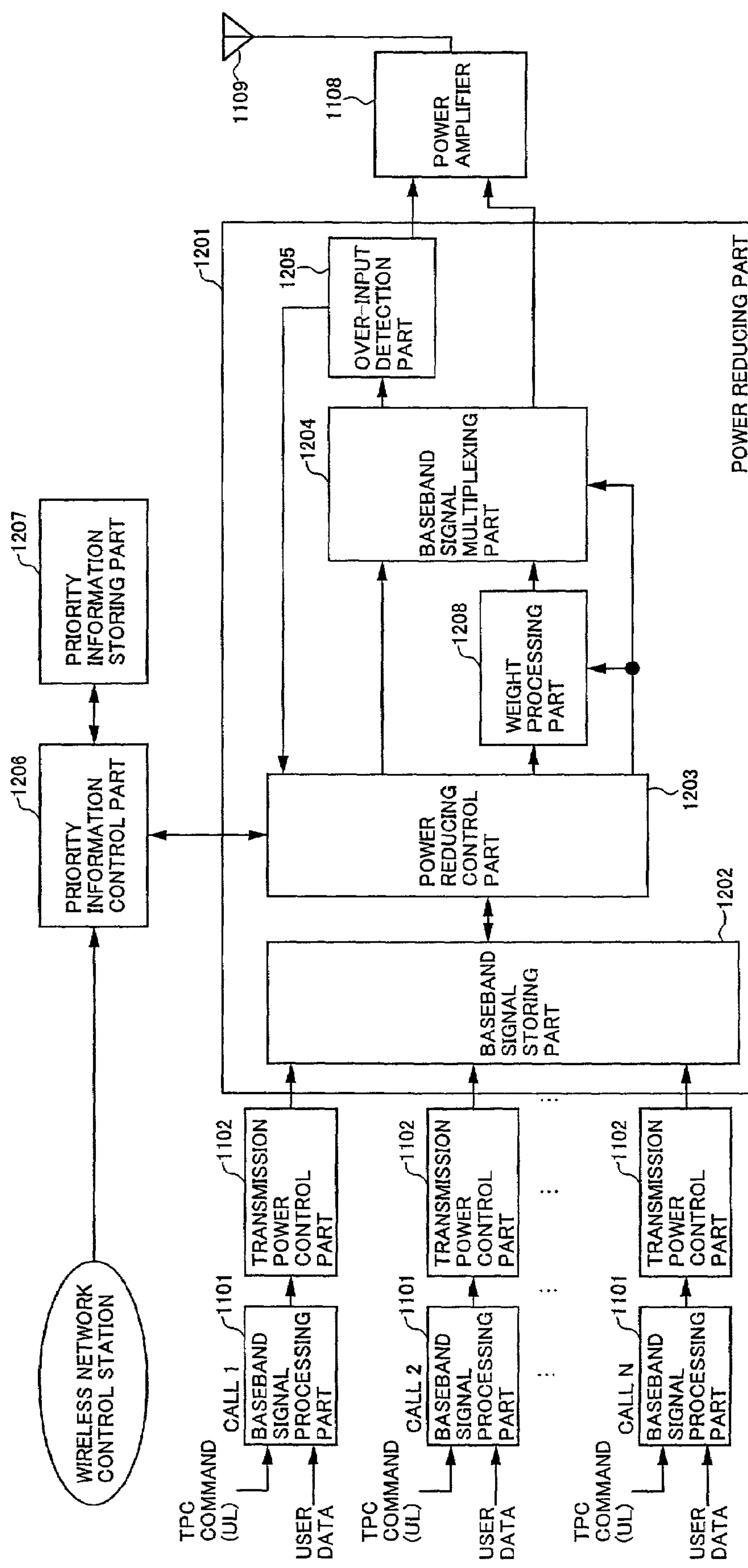
FIG.19
WIRELESS NETWORK CONTROL STATION
PRIORITY INFORMATION CONTROL PART
1206
PRIORITY INFORMATION STORING PART
1207
POWER REDUCING PART
1201
BASEBAND SIGNAL STORING PART
1202
POWER REDUCING CONTROL PART
1203
WEIGHT PROCESSING PART
1208
BASEBAND SIGNAL MULTIPLEXING PART
1204
OVER-INPUT DETECTION PART
1205
POWER AMPLIFIER
1108
1109
TPC COMMAND (UL)
USER DATA
CALL 1
CALL 2
CALL N
BASEBAND SIGNAL PROCESSING PART
1101
TRANSMISSION POWER CONTROL PART
1102
200

TRANSMISSION POWER CONTROL APPARATUS, TRANSMISSION POWER CONTROL METHOD, AND MOBILE STATION

BACKGROUND OF THE INVENTION

1. Field of the Invention

The present invention generally relates to transmission power control in a wireless communication system adopting CDMA (Code Division Multiple Access). Especially, the present invention relates to a transmission power control apparatus and a transmission power control method for controlling transmission power in a base station.

In addition, the present invention relates to a mobile station communicating with the base station having the transmission power control apparatus.

2. Description of the Related Art

In the following, conventional transmission power control in a wireless communication system adopting CDMA will be described. A wireless communication system shown in FIG. 1 is taken as an example here. In the wireless communication system, a wireless network control station 1 controls a plurality of base stations 2, each base station 2 controls one cell 3 and the base station communicates with mobile stations 4 in the cell by wireless. The wireless network control station 1 is normally connected to the base stations 2 by cable.

Next, conventional transmission power control method will be described by using FIG. 2. So-called closed loop transmission control performed between the base station and the mobile station will be described.

In the mobile station 4, a signal sent from the base station 2 is received by a receiver 11. Then, SIR (Signal/Interference Ratio) of the received signal is measured by a received SIR measuring part 12.

The received SIR is compared with a target SIR which is previously held by a comparing circuit 13 so that transmission power control information is generated on the basis of the result of comparison. The transmission power control information (normally included in TPC bits) is sent to the base station 1102 by a transmitter 14.

A receiver 15 of the base station 2 receives the transmission power control information, and sends the transmission power control information to a transmission power control circuit 16. The transmission power control circuit 16 changes transmission power of the transmitter 17 according to the transmission power control information.

In the base station 2, the receiver 15 receives a signal sent from the mobile station 4, and SIR of the received signal is measured by a received SIR measuring part 18.

The received SIR is compared with a target SIR which is previously held by a comparing circuit 19 so that transmission power control information is generated on the basis of the result of comparison. The transmission power control information (normally included in TPC bit) is sent to the mobile station 4 by the transmitter 17.

A receiver 11 of the mobile station 4 receives the transmission power control information, and sends the transmission power control information to a transmission power control circuit 20. The transmission power control circuit 20 changes transmission power of the transmitter 14 according to the transmission power control information.

As mentioned above, according to the conventional transmission power control method, the base station and the mobile station monitors each other, and perform adjustment of transmission power with reference to SIR. That is, when the received SIR is smaller than the target SIR, the base station or the mobile station instructs the other end station to increase transmission power. On the other hand, when the received SIR is larger than the target SIR, the base station or the mobile station instructs the other end station to decrease transmission power.

In addition, the conventional transmission power control apparatus sets an upper limit value and a lower limit value of transmission power which can be used by a call (or a user) when establishing down-link.

The reason for setting the upper limit value and the lower limit value is (1) to prevent a call (or a user) from occupying transmission power more that a predetermined value, (2) to limit interference power given to other call, and (3) to stabilize the mechanism of the transmission power control.

The setting of the upper limit value and the lower limit value will be described with reference to FIGS. 3A and 3B. FIG. 3A is a graph schematically showing an example of the upper limit value and the lower limit value set for a call. FIG. 3B is a graph showing an example of transition of transmission power with respect to time. As shown in FIG. 3A, the upper limit value of transmission power occupied by a call is set to be 30% of the maximum power which can be transmitted by the base station, and the lower limit value is set to be 10% of the maximum power which can be transmitted by the base station.

Effects of the upper limit value and the lower limit value exerted on the transmission power of the call will be described by using FIG. 3B. The transmission power changes according to before mentioned transmission power control with respect to time. However, when a power value exceeding the upper limit value (30%) should be set according to the transmission power control, the upper limit value functions so as to reduce the transmission power below the upper limit value as shown in the figure.

In addition to controlling the power value by using the upper limit value, the conventional transmission power control apparatus performs control of suppressing over-input to a transmission amplifier. That is, when many calls are temporarily connected, although transmission power of each call is within the upper limit value, there is a case in which total transmission power of the calls exceeds the maximum allowable input value of the transmission amplifier. For solving this problem, a part for reducing total transmission power is provided before the transmission amplifier to prevent over-input.

This reducing control will be described with reference to FIGS. 4A–4C. In this example, four calls (calls 1–4) are connected in which call 1 and call 2 are circuit switching type calls, and call 3 and call 4 are packet switching type calls, and the upper limit value of each call is 5. When transmission power of each call changes while being controlled by the upper limit value as shown in FIG. 4A, the total sum of the transmission power of the calls is as shown in FIG. 4B.

If the maximum allowable input value of the transmission amplifier is 14, the upper limit value of the transmission power shown in FIG. 4B becomes 14 so that the transmission power is to be reduced below 14 if it exceeds 14. FIG. 4C shows a graph after the transmission power is reduced. As shown in FIG. 4C, parts where transmission power exceeds 14 in FIG. 4B becomes flat at 14.

As mentioned above, according to the conventional transmission control apparatus prevents over-input to the transmission amplifier by transmission power control on the basis of SIR by reducing the transmission power before the transmission amplifier.

However, according to the conventional transmission power control, when the total transmission power reaches the maximum allowable input value as a result of changing transmission power of each call, the transmission power of each call in the multiplexed calls is lowered uniformly and evenly. Therefore, there is a problem in that requirement for each call can not be reflected so that communication quality of the whole system deteriorates.

In the following, the conventional technology will be described from another aspect.

In a wireless communication system adopting W-CDMA, distinction between channels is performed by code instead of frequency in which all users share the same frequency.

For example, when considering communication between the base station and a plurality of mobile stations, communication capacity in the above-mentioned system is determined by transmission power of each mobile station since all mobile stations share the same frequency.

If each mobile station performs transmission by using a predetermined fixed power, excessive transmission power may be used depending on a place where communication is performed. This is inefficient.

Thus, in a conventional system, high speed transmission power control (Transmitter Power Control: TPC) is performed in up-link and down-link between the base station and the mobile station to change transmission power of each mobile station every moment. More particularly, transmission power of each mobile station is controlled such that each call has a SIR by measuring SIR (Signal/Interference Ratio) of a communication channel.

As mentioned before, this control is normally performed in the following way. The mobile station measures SIR of a call used by the mobile station itself, calculates difference between the measured SIR and a predetermined SIR (a target SIR). Then, the mobile station sends, to the base station, a transmission power increase or decrease request (TPC command) for reducing the above-mentioned difference by using TPC bits inserted into data header of the up-link channel. After that, the base station increases or decreases the amplitude of transmission signal according to the command (TPC command).

According to the transmission power control, SIR of each call becomes constant, and transmission by excessive transmission power more than enough for satisfying the SIR is not performed so that communication quality and channel efficiency improve.

Even in TPC, as for a control channel such as CCCH (common control channel) which is commonly used by a plurality of users, the transmission power is kept constant.

However, according to the conventional transmission power control (TPC), when the transmission power of the base station reaches the maximum allowable value as a result of performing increase or decrease of amplitude of transmission signal of each call according to TPC, transmission power of each call is lowered evenly and uniformly. Therefore, there is a problem in that requirement for each call can not be reflected so that communication quality of the system deteriorates as a whole as mentioned above.

In the following, the problem will be described in detail with reference to FIGS. 5–7.

Regarding a down-link from the base station to the mobile station, transmission power of the base station has a limitation due to performance of the base station. As the number of connecting mobile stations increases, the transmission power increases consequentially. Therefore, the limitation of the transmission power determines the number of mobile stations which can be connected to the base station. In any way, there may be a case in which the transmission power reaches the maximum allowable value which can not be increased any more as a result of increasing or decreasing the transmission power of the base station according to TPC regardless of the number of the mobile stations.

Since TPC continues to function as before even in the above-mentioned situation, the transmission power may exceeds the maximum allowable value according to TPC so that the amplifier may be damaged. In order to solve this problem, an over-input reducing part, which is a limiter for example, is provided before a transmission amplifier such that transmission power larger than a allowable value is not applied to the transmission amplifier in order to protect the transmission amplifier from damaging. In the following, a conventional transmission power control apparatus will be described with reference to FIG. 5.

FIG. 5 is a block diagram showing only components relating to the present invention in a conventional transmission power control apparatus 600. In this case, the transmission power control apparatus is included in the base station. The transmission power control apparatus 30 includes a plurality of (for example N) baseband signal processing parts 31, transmission power control parts 32 each provided after the baseband signal processing part 31, a baseband signal multiplexing part 33 for multiplexing baseband transmission signals of each call, an over-input control part 34 which is a limiter for example, a power amplifier 35 and an antenna 36.

Each baseband signal processing part 31 performs baseband processing on user data to be transmitted for each call.

Each transmission power control part 32 increases or decreases amplitude for each transmission signal which is baseband-processed according to a TPC command from up-link.

The baseband signal multiplexing part 33 multiplexes transmission signals of each call.

The over-input reducing part 34 is a limiter for example, and, in order to protect the power amplifier 35 from damaging, the over-input reducing part 34 reduces the amplitude of the multiplexed transmission signal below a predetermined value such that a signal having power value larger than an input allowable power value of the power amplifier is not input into the power amplifier 35.

The power amplifier 35 amplifies a multiplexed transmission signal by a constant gain. The antenna radiates the transmission signal.

Next, the above-mentioned power reducing will be described with reference to FIGS. 6 and 7. FIG. 6 shows a schematic graph for a case when transmission power reducing is not performed for transmission power of the base station. FIG. 7 shows a schematic graph for a case when the transmission power reducing is performed by the conventional apparatus. In this example, signals are transmitted for calls 1–5, and the maximum allowable transmission power of the base station is 10 on the vertical axis of the graph. Then, it can be recognized that the transmission power exceeds the maximum allowable value at times 2, 3 and 6.

According to the conventional apparatus, since the total transmission power of the transmission signals of every call is reduced as a whole before the transmission amplifier, the transmission power of each call is reduced evenly, that is, in the same ratio.

That is, since the conventional apparatus reduces the total transmission power as a whole before the transmission amplifier, the transmission power of each transmission signal is reduced evenly, that is, in a same ratio. Therefore, quality deterioration and the like may be caused to every call. Although decreasing the transmission power evenly, for each call may be fair, type of circuit of each call is not considered by this method so that the system becomes inefficient as a whole and can not provide a kind communication service for users.

For example, as for voice communication which is performed by circuit switching for realizing real-time communication, it is practically difficult to compensate for quality deterioration by retransmission and the like, in addition, when communication stops due to quality deterioration, a serious problem occurs if the communication is for emergency (for example, communication from an ambulance carrying a sick person to a hospital.).

Accordingly, in a wireless communication system accommodating a plurality of types of circuits having various requirements, the conventional method in which the total transmission power is lowered as a whole without consideration of types of circuit is not efficient (especially when a call of the circuit switching type is included), and using the conventional method may lead to deterioration of communication quality as a whole system.

SUMMARY OF THE INVENTION

An object of the present invention is to provide a transmission power control apparatus and a transmission power control method for preventing deterioration of communication quality when reduction of transmission power is necessary for avoiding over-input to the power amplifier.

The above object is achieved by a transmission power control apparatus for a wireless communication apparatus for reducing a power value of a signal input to a power amplifier to the maximum allowable input power value of the power amplifier or below, the transmission power control apparatus including:

a setting part for setting a transmission power upper limit value of a call according to a circuit type of the call; and a power reducing part for reducing transmission power for the call to the transmission power upper limit value or below.

According to this configuration, since transmission power of a part of calls can be reduced by providing the upper limit value, probability that transmission power reduction process before the amplifier becomes necessary can be decreased so that it can be prevented that communication quality of whole calls degrades due to transmission power reduction.

In the transmission power control apparatus, the setting part may set the transmission power upper limit value according to a degree of delay which can be allowed for the circuit type.

In the transmission power control apparatus, the setting part may set a first upper limit value for a call of a packet switching type or a second upper limit value for a call of a circuit switching type.

In the transmission power control apparatus, the first upper limit value may be smaller than the second upper limit value.

According to the above configuration, probability that transmission power reduction process becomes necessary decreases by lowering transmission power of calls of a circuit type (for example, packet switching type) which allows delay to a certain degree. Thus, it can be prevented that communication quality of calls of a circuit type (for example, circuit switching type) which does not allow delay is deteriorated due to transmission power reduction.

In the transmission power control apparatus, the setting part monitors occurrence of over-input to the power amplifier, and sets another transmission power upper limit value when the over-input occurs.

In addition, the setting part reduces the first upper limit value by a first predetermined ratio when the over-input to the power amplifier occurs, and the setting part increases the first upper limit value by a second predetermined ratio which is lower than the first predetermined ratio when the over-input to the power amplifier does not occur.

That the over-input occurs even when the upper limit value is set for each call means that the upper limit value is still high. Thus, in such a case, the upper limit value for the calls of the packet switching type is lowered such that communication quality of calls of the circuit switching type is not lowered.

In addition, when the over-input does not occur for a predetermined period, there is a possibility that transmission power for the packet switching type is reduced more than necessary. Thus, the upper limit value is increased.

In the transmission power control apparatus, the setting part monitors occurrence of call loss, and sets another transmission power upper limit value when the call loss occurs.

That the call loss occurs even when the upper limit value is set for each call means that power reduction occurs so that communication quality deteriorates. Thus, in such a case, the upper limit value for the calls of the packet switching type is lowered such that communication quality of calls of the circuit switching type is not lowered.

The above object is also achieved by a transmission power control apparatus for a wireless communication apparatus for reducing a power value of a signal input to a power amplifier to the maximum allowable input power value of the power amplifier or below, the transmission power control apparatus including:

an SIR determining part for determining a control target SIR according to a circuit type of a call;

a target SIR setting part for sending the control target SIR to a communication station corresponding to the call.

According to the configuration, since transmission power control information generated by a mobile station can be changed by providing the control target SIR to the mobile station, transmission power of a part of calls can be decreased. Accordingly, probability that transmission power reduction process before the amplifier becomes necessary can be decreased so that it can be prevented that communication quality of whole calls degrades due to transmission power reduction.

In the transmission power control apparatus, the SIR determining part may set the control target SIR according to a degree of delay which can be allowed for the circuit type.

In the transmission power control apparatus, the SIR determining part may set a first control target SIR for a call of a packet switching type or a second control target SIR for a call of a circuit switching type.

In the transmission power control apparatus, the first control target SIR may be smaller than the second control target SIR.

According to the above configuration, probability that transmission power reduction process becomes necessary decreases by lowering transmission power of calls of a circuit type (for example, packet switching type) which allows delay to a certain degree. Thus, it can be prevented that communication quality of calls of a circuit type (for example, circuit switching type) which doe not allow delay id deteriorated due to transmission power reduction.

In the transmission power control apparatus, the SIR determining part monitors occurrence of over-input to the power amplifier, and sets another control target SIR when the over-input occurs.

In the transmission power control apparatus, the SIR determining part reduces the first control target SIR by a first predetermined ratio when the over-input to the power amplifier occurs, and the SIR determining part increases the first control target SIR by a second predetermined ratio which is lower than the first predetermined ratio when the over-input to the power amplifier does not occur.

That the over-input occurs even when the control target SIR is set for each call means that the control target SIR is still high. Thus, in such a case, the control target SIR for the calls of the packet switching type is lowered such that communication quality of calls of the circuit switching type is not lowered.

In addition, when the over-input does not occur for a predetermined period, there is a possibility that transmission power for the packet switching type is reduced more than necessary. Thus, the control target SIR is increased.

In the transmission power control apparatus, the SIR determining part monitors occurrence of call loss, and sets another control target SIR when the call loss occurs.

That the call loss occurs even when the control target SIR is set for each call means that power reduction occurs so that communication quality deteriorates. Thus, in such a case, the control target SIR for the calls of the packet switching type is lowered such that communication quality of calls of the circuit switching type is not lowered.

The above object is also achieved by a mobile station for communicating with a base station, the base station including:

a part for comparing a received SIR with a target SIR which is stored by the base station, and sending transmission power control information to the base station according to the comparing result;

a part for receiving a control target SIR from the base station, and setting the control target SIR as a new target SIR to be compared with the received SIR;

wherein the base station includes a transmission power control apparatus for reducing a power value of a signal input to a power amplifier to the maximum allowable input power value of the power amplifier or below, the transmission power control apparatus including:

an SIR determining part for determining the control target SIR according to a circuit type of a call;

a target SIR setting part for sending the control target SIR to the mobile station.

According to the configuration, since the mobile station can compare the control target SIR sent from the base station with the received SIR when generating transmission power control information to be sent to the base station, the base station can control the transmission power control information sent from the mobile station.

The above object is also achieved by a transmission power control method used for a wireless communication apparatus for reducing a power value of a signal input to a power amplifier to the maximum allowable input power value of the power amplifier or below, the transmission power control method including the steps of:

setting a transmission power upper limit value for a call according to a circuit type of the call; and reducing transmission power for the call to the transmission power upper limit value or below.

In the transmission power control method, the transmission power upper limit value may be set according to a degree of delay which can be allowed for the circuit type.

In the transmission power control method, a first upper limit value for a call of a packet switching type or a second upper limit value for a call of a circuit switching type may be set as the transmission power upper limit value.

In the transmission power control method, the first upper limit value is smaller than the second upper limit value.

In the transmission power control method, another transmission power upper limit value may be set when the over-input to the power amplifier occurs.

The transmission power control method may includes the steps of:

reducing the first upper limit value by a first predetermined ratio when the over-input to the power amplifier occurs;

increasing the first upper limit value by a second predetermined ratio which is lower than the first predetermined ratio when the over-input to the power amplifier does not occur.

In the transmission power control method, another transmission power upper limit value may be set when call loss occurs.

The above object is also achieved by a transmission power control method used for a wireless communication apparatus for reducing a power value of a signal input to a power amplifier to the maximum allowable input power value of the power amplifier or below, the transmission power control method including the steps of:

determining a control target SIR according to a circuit type of a call; and sending the control target SIR to a communication station corresponding to the call.

In the transmission power control method, the control target SIR may be set according to a degree of delay which can be allowed for the circuit type.

In the transmission power control method, a first control target SIR for a call of a packet switching type or a second control target SIR for a call of a circuit switching type may be set.

In the transmission power control method, the first control target SIR may be smaller than the second control target SIR.

In the transmission power control method, another control target SIR may be set when over-input to the power amplifier occurs.

The transmission power control method may include the steps of:

reducing the first control target SIR by a first predetermined ratio when the over-input to the power amplifier occurs;

increasing the first control target SIR by a second predetermined ratio which is lower than the first predetermined ratio when the over-input to the power amplifier does not occur.

In the transmission power control method, another control target SIR may be set when call loss occurs.

The above object is also achieved by a transmission power control apparatus for a wireless communication apparatus for reducing a power value of a signal of calls input to a power amplifier to the maximum allowable input power value of the power amplifier or below, the transmission power control apparatus including:

a classifying part for classifying calls into a plurality of groups;

a power reducing part for reducing a power value individually for each group such that a power value of the calls is equal to or below the maximum allowable input power value of the power amplifier.

In this configuration, the calls can be classified into the groups by providing a plurality of baseband signal multiplexing parts each multiplexing a part of transmission signals and by inputting transmission signals of each call into one of the baseband signal multiplexing part.

According to the configuration, when transmission power needs to be reduced, it can be prevented that the effect of power reduction is exerted on the whole calls. Thus, communication quality of the whole system can be improved.

In the transmission power control apparatus, the power reducing part may set an upper limit value of power for each group, and reduces a power value to the upper limit value or below for each group.

According to the configuration, power can be easily reduced by using limiters, for example.

In the transmission power control apparatus, the classifying part may classify the calls according to degree of delay which is allowed by a circuit type of a call.

In the transmission power control apparatus, the classifying part may classify the calls into a group of a circuit switching type and a group of a packet switching type.

In the transmission power control apparatus, the upper limit value for a group of the packet switching type may be smaller than the upper limit value for a group of the circuit switching type.

In the transmission power control apparatus, the power reducing part may reduce only a power value of a group of the packet switching type.

In the above configuration, the degree of delay which is allowed by a circuit type of a call means tolerance to error. As for the circuit type, there are two circuit types which are a circuit type for which degradation of communication quality is not allowed and tolerance to error is relatively low, and a circuit type for which degradation of communication quality is allowed to some extent and tolerance to error is relatively high. The former is a call of a circuit switching type such as voice communication for example, and the latter is a call of a packet switching type such as data communication for example.

According to the configuration, the calls are classified according to the circuit type. Thus, it can be prevented that communication quality of calls which have relatively small tolerance to error is deteriorated due to transmission power reduction by reducing transmission power of a group of calls (packet switching type) having relatively large tolerance to error and by avoiding to reduce transmission power of a group of calls (circuit switching type) having relatively small tolerance to error as possible.

In the transmission power control apparatus, the number of the plurality of groups and the upper limit value for each group may be changed according to types of the calls.

In this configuration, the change of the upper limit value can be realized by using a limiter in which threshold (upper limit value) can be changed by control from the outside and by changing the threshold according to the circuit type.

According to the configuration, the calls can be adaptively classified into groups.

In the transmission power control apparatus, the classifying part assigns priority for each call according to circuit characteristics of the call, and the power reducing part reduces a power value of a call according to the priority.

In the transmission power control apparatus, the classifying part may assign the priority such that the larger a degree of delay which is allowed by the call is, the lower the priority is, and, the power reducing part may reduce each power value of a part of calls in ascending order of the priority of each call such that a power value of calls input to the power amplifier is equal to or below the maximum allowable input power value of the power amplifier.

According to the configuration, the calls can be classified more finely without increasing the size of the apparatus and without complicating the apparatus so that transmission power reduction which reflects characteristics of each call more accurately can be realized. Thus, communication quality of the whole system improves.

In addition, by reducing the power of a call such that the larger the degree of allowed delay, the larger the reduction ratio is, transmission power can be reduced while maintaining communication quality of calls which does not allow delay.

In the transmission power control apparatus, the power reducing part may not reduce a power value of a call which has priority within predetermined levels from the highest priority.

According to the configuration, since the power value of calls having high priority is maintained, communication quality is not deteriorated for the calls of the high priority due to transmission power reduction.

The above object is also achieved by a base station in a wireless communication system, the base station including:

a transmission power control apparatus for reducing a power value of a signal of calls input to a power amplifier to the maximum allowable input power value of the power amplifier or below, the transmission power control apparatus including:

a classifying part for classifying calls into a plurality of groups;

a power reducing part for reducing a power value individually for each group such that a power value of the calls is equal to or below the maximum allowable input power value of the power amplifier.

The above object is also achieved by a transmission power control method used for a wireless communication apparatus for reducing a power value of a signal of calls input to a power amplifier to the maximum allowable input power value of the power amplifier or below, the transmission power control method including the steps of:

classifying calls into a plurality of groups;

reducing a power value individually for each group such that a power value of the calls is equal to or below the maximum allowable input power value of the power amplifier.

In the transmission power control method, an upper limit value of power may be set for each group, and a power value is reduced to the upper limit value or below for each group.

In the transmission power control method, the calls may be classified according to degree of delay which is allowed by a circuit type of a call.

In the transmission power control method, the calls may be classified into a group of a circuit switching type and a group of a packet switching type.

In the transmission power control method, the upper limit value for a group of the packet switching type may be smaller than the upper limit value for a group of the circuit switching type.

In the transmission power control method, only a power value of a group of the packet switching type may be reduced.

In the transmission power control method, the number of the plurality of groups and the upper limit value for each group may be changed according to types of the calls.

The transmission power control method may includes the steps of:

assigning priority for each call according to circuit characteristics of the call; and reducing a power value of a call according to the priority.

In addition, the transmission power control method may include the steps of:

assigning the priority such that the larger a degree of delay which is allowed by the call is, the lower the priority is; and reducing each power value of a part of calls in ascending order of the priority of each call such that a power value of calls input to the power amplifier is equal to or below the maximum allowable input power value of the power amplifier.

In the transmission power control method, a power value of a call which has priority within predetermined levels from the highest priority may not be reduced.

The transmission power control method may include the steps of:

assigning the priority such that the larger a degree of delay which can be allowed by the call, the lower the priority is;

determining at least a power reduction subject call from a call having the lowest priority in ascending order of priority such that a power value of calls input to the power amplifier becomes equal to or below the maximum allowable input power value if it is assumed that each power value of the at least a power reduction subject call is reduced to a minimum power value which can maintain synchronization;

reducing each power value of calls in the at least a power reduction subject call other than calls having the highest priority in the at least a power reduction subject call to a minimum power value which can maintain synchronization; and reducing each power value of calls having the highest priority in the at least a power reduction subject call evenly by a predetermined ratio such that a power value of calls input to the power amplifier becomes equal to or below the maximum allowable input power value.

According to this method, by reducing power of each call from a call having the lowest priority in ascending order of priority, transmission power reduction is realized while avoiding to reduce power of calls having high priority where possible.

In addition, by reducing the power of a call to the minimum value which can maintain synchronization, at least synchronization of the call is kept after the transmission power reduction is performed.

BRIEF DESCRIPTION OF THE DRAWINGS

Other objects, features and advantages of the present invention will become more apparent from the following detailed description when read in conjunction with the accompanying drawings, in which:

FIG. 19 is a schematic block diagram showing a part of the transmission power control apparatus 1200 relating to the embodiment 2-2 of the present invention;

DETAILED DESCRIPTION OF THE PREFERRED EMBODIMENTS

In the following, first embodiments and second embodiments of the present invention will be described with reference to figures. The first embodiments includes embodiments 1-1–1-4 and the second embodiments includes embodiments 2-1–2-2.

FIRST EMBODIMENTS (Embodiment 1-1)

First, the,transmission power control apparatus of the first embodiment of the present invention will be described by using FIGS. 8–10C. In this embodiment, probability that over-input to a power amplifier is detected is decreased by providing an upper limit value in transmission power control for transmission signals, and, the upper limit value is provided for each call in a plurality of calls which form a transmission signal according to a circuit type so that communication quality deterioration of calls of circuit switching type is prevented.

Figure 8:
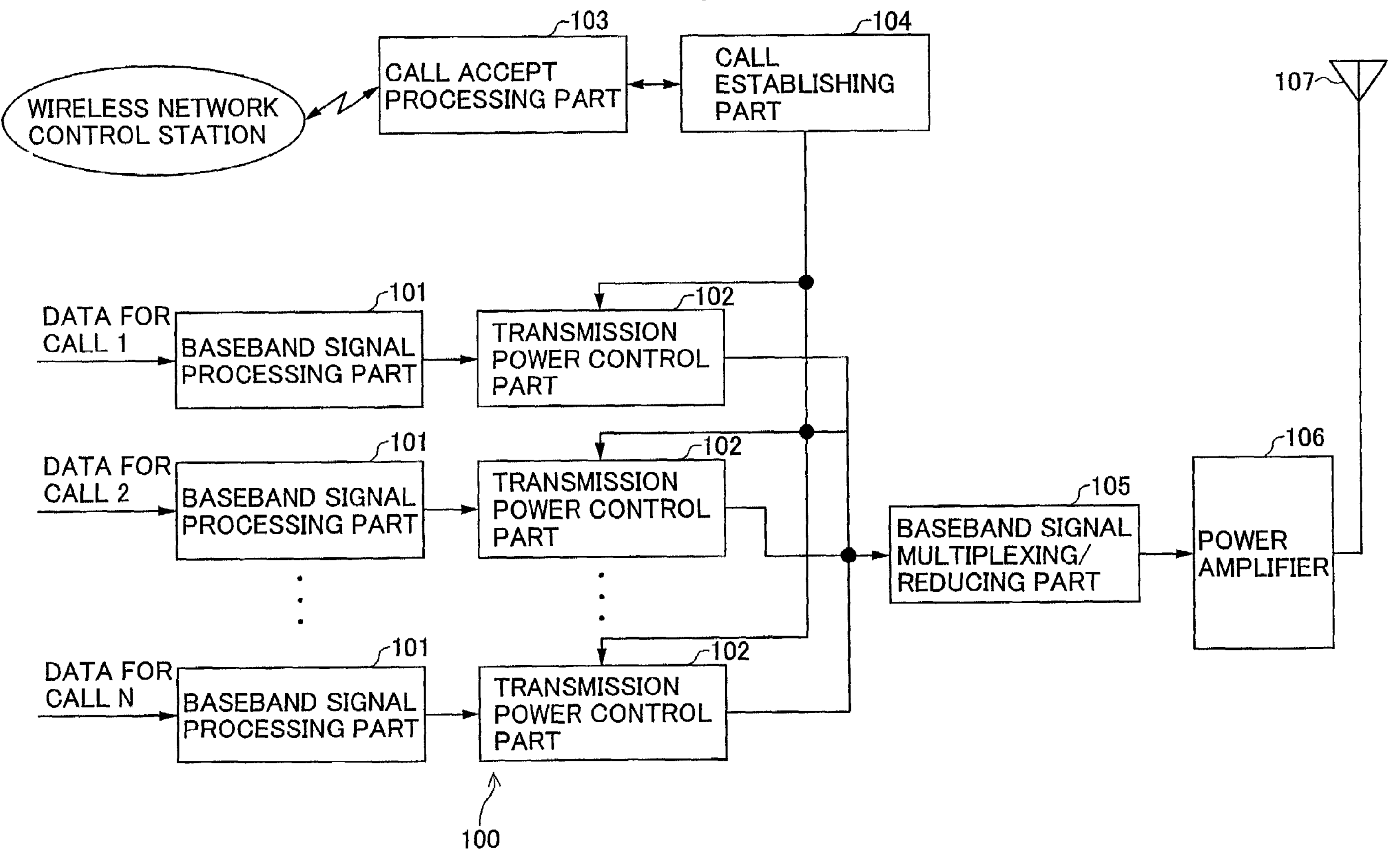
FIG. 8 is a schematic block diagram showing a transmission power control apparatus 100 according to the embodiment 1-1 of the present invention.
Figure 9:
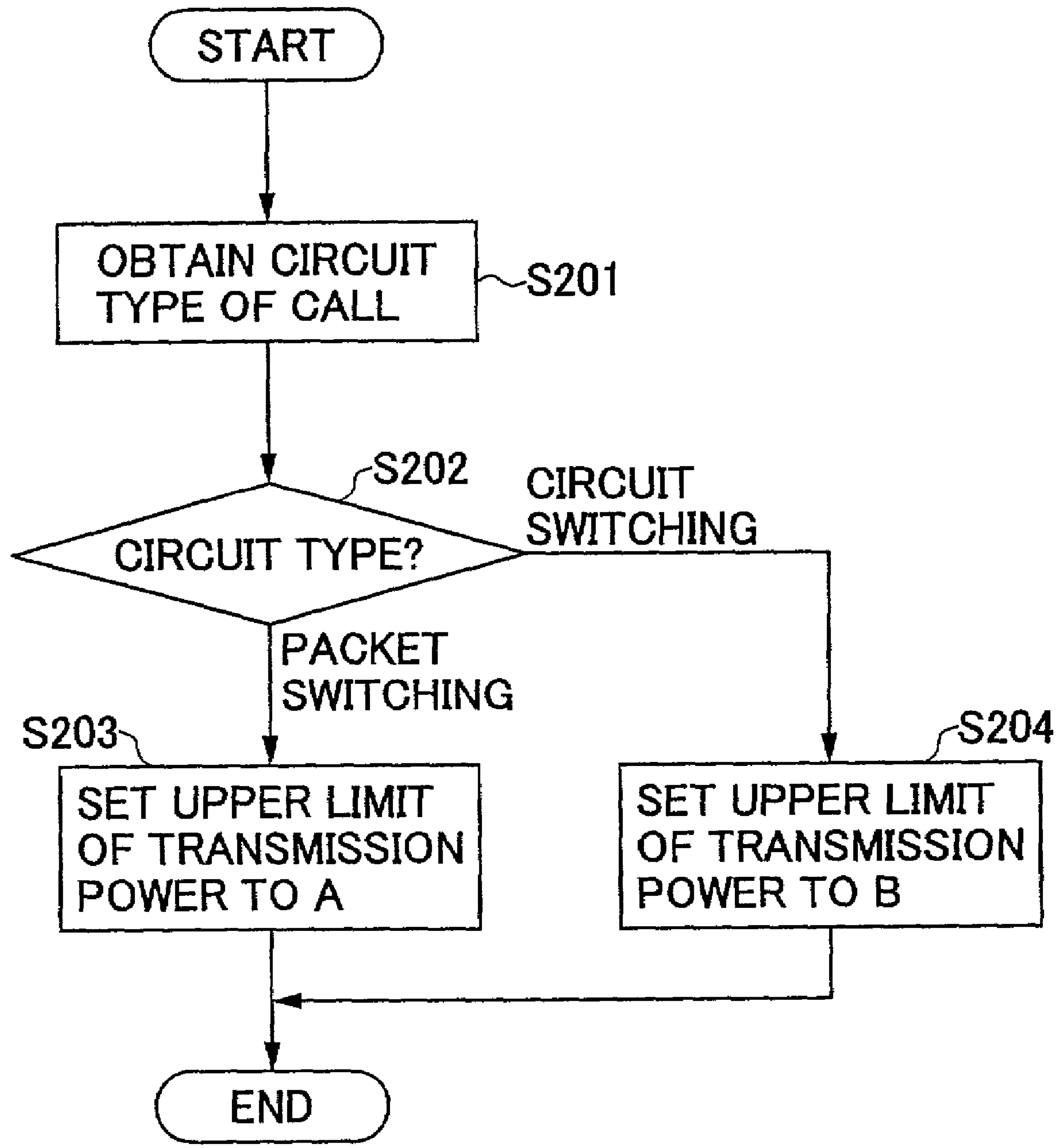
FIG. 9 is a flowchart of a call establishing process in the transmission power control apparatus 100 of the embodiment 1-1 of the present invention.
Figure 10B:
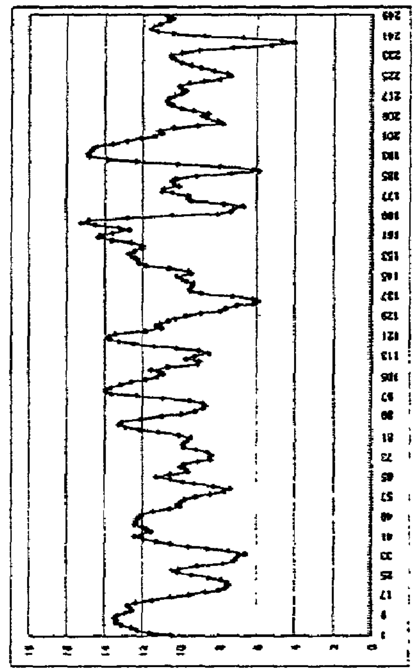
FIGS. 10A–10C are graphs showing an example of change of transmission power with respect to time under transmission power control by the transmission power control apparatus 100 of the embodiment 1-1 of the present invention.
Figure 10C:
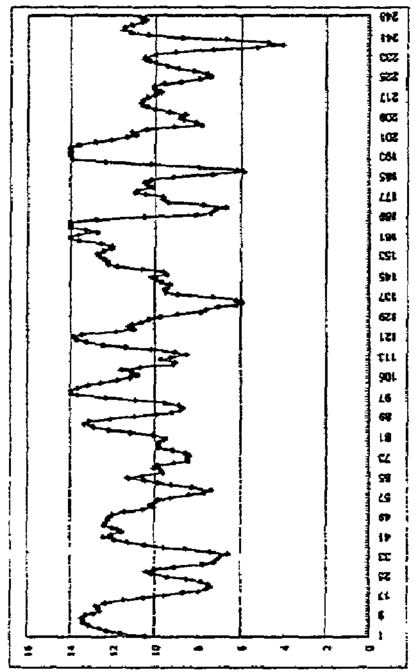
Figure 10A:
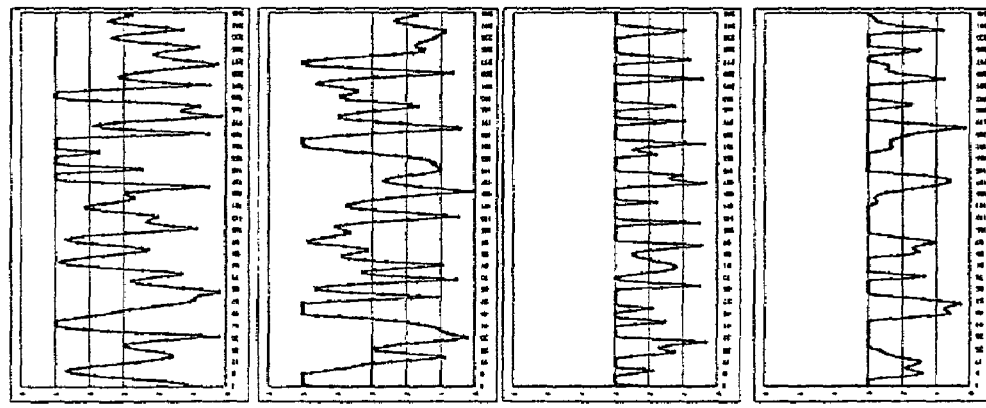

FIG. 8 is a schematic block diagram showing the transmission power control apparatus 100 according to the first embodiment of the present invention. FIG. 9 is a flowchart of a call establishing process in the transmission power control apparatus 100 of the embodiment 1-1 of the present invention. FIGS. 10A–10C are graphs showing an example of change of transmission power with respect to time under transmission power control by the transmission power control apparatus 100 of the embodiment 1-1 of the present invention. For example, the transmission power control apparatus 100 is included in a base station in a wireless communication system.

The configuration of the transmission power control apparatus 100 will be described with reference to FIG. 8. The transmission power control apparatus includes a plurality of (N, for example) baseband signal processing parts 101, transmission power control parts 102 each provided after the baseband signal processing part 101, a call accept processing part 103 and a call establishing part 104 for establishing and releasing wireless circuits, a baseband signal multiplexing/reducing part 105 for multiplexing/reducing baseband transmission signals of each call, a power amplifier 106, and an antenna 107.

The baseband signal processing part 101 performs baseband processing on user data to be transmitted for each call.

Each transmission power control part 102 decreases or increases amplitude of a transmission signal for each call which is baseband-processed according to transmission power control information from an up-link. At this time, when the power value instructed from the call establishing part 104 exceeds the upper limit value, the power value is reduced to the upper limit value.

The call accept processing part 103 obtains information on a circuit type of each call from, for example, a wireless network control station of the outside of the apparatus, and sends the information to the call establishing part 104. The call establishing part 104 instructs a power upper limit value to the transmission power control part 102 for each call according to the circuit type of each call on the basis of the circuit type information.

In this embodiment, two values (upper limit values A, B) are provided as the power upper limit value, and the values are classified based on whether the circuit type is the circuit exchange type or the packet switching type.

The baseband signal multiplexing/reducing part 105 multiplexes input baseband transmission signals, and reduces the total transmission power for every call evenly before multiplexing when the transmission power is larger than the maximum allowable input value of the power amplifier 107. The power amplifier 106 amplifies the multiplexed transmission signal by a constant gain. The antenna 107 radiates the transmission signal.

Next, the operation of the transmission power control apparatus 100 of this embodiment will be described. When the transmission power control apparatus 100 receives a call origination request from a mobile station, the call accept processing part 103 obtains the circuit type of the call. Then, the call establishing part 104 determines the upper limit value of the corresponding transmission power control part 102 according to the circuit type. FIG. 9 shows the upper limit value determining process according to this embodiment.

When the call origination request is received and the power upper limit value process for the call is started, information on the circuit type obtained by the call accept processing part 103 is input into the call establishing part 104 in step 201.

Next, the circuit type is determined by the call establishing part 104 in step 202. As mentioned before, the circuit type is classified into the packet switching type and the circuit switching type. The upper limit value A is assigned to a call of the packet switching type, and the upper limit value B is assigned to a call of the circuit switching type in steps 203 and 20A.

Thus determined upper limit values of each transmission power control part 102 are set to each transmission power control part 102 by the call establishing part 104. Accordingly, accepting process of the call ends.

The transmission signal of each call is baseband-processed by the baseband signal processing part 101. Then, the transmission power of the transmission signal is increased or decreased according to the transmission power control information of the up-link by the transmission power control part 102. At this time, when the increased or decreased transmission power is equal to or larger than the upper limit value instructed by the call establishing part 104, the transmission power is reduced to the upper limit value.

The transmission signals in which transmission power is controlled are multiplexed by the baseband signal multiplexing/reducing part 105, and the power is reduced to the maximum allowable input value of the power amplifier 106 as necessary. Then, the transmission signal is amplified by the power amplifier 106, and radiated from the antenna 107.

In this embodiment, the upper limit values A and B are set such that A<B is satisfied. The reason is that the call of the circuit switching type is more susceptible to the effect of power reduction than the packet switching type, and degradation of the communication quality should be avoided for the circuit switching type call. That is, the call of the circuit switching type such as voice communication has strict allowable delay requirement and requires real-time processing, and the call has low tolerance to error. On the other hand, the call of-the packet switching type such as data communication has relatively large allowance for delay since the packet switching type has an error correction means such as retransmission request. Thus, this type has relatively large tolerance to error. Thus, the upper limit value for transmission power control for the call of the packet switching type is set to be lower than the value for the circuit switching type, for example, such that A=20%, B=30%.

Figure 1:
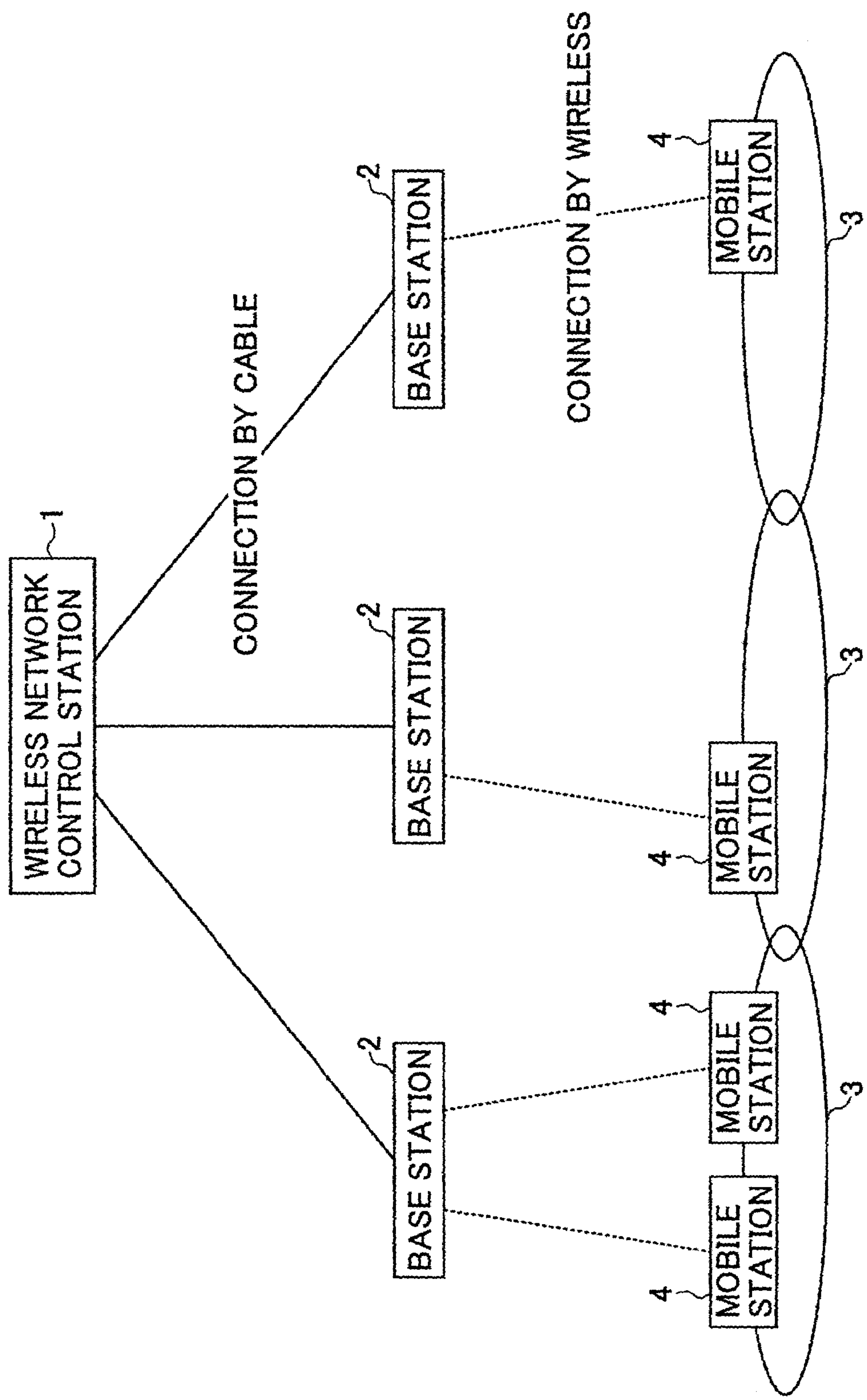
FIG. 1 shows an example of a wireless communication system.
Figure 2:
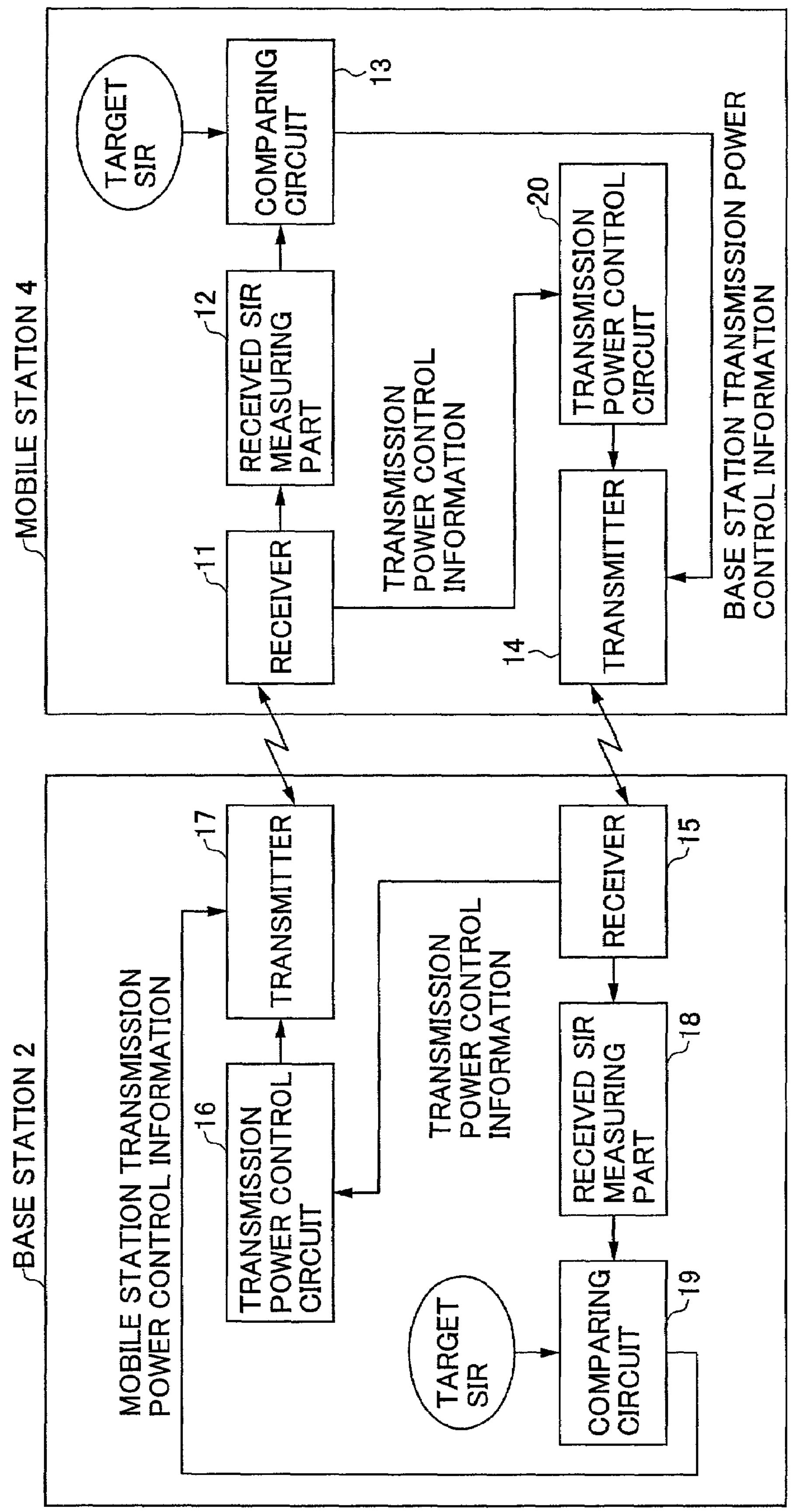
FIG. 2 shows a block diagram showing a base station and a mobile station for explaining a conventional transmission power control method.
Figure 3A:
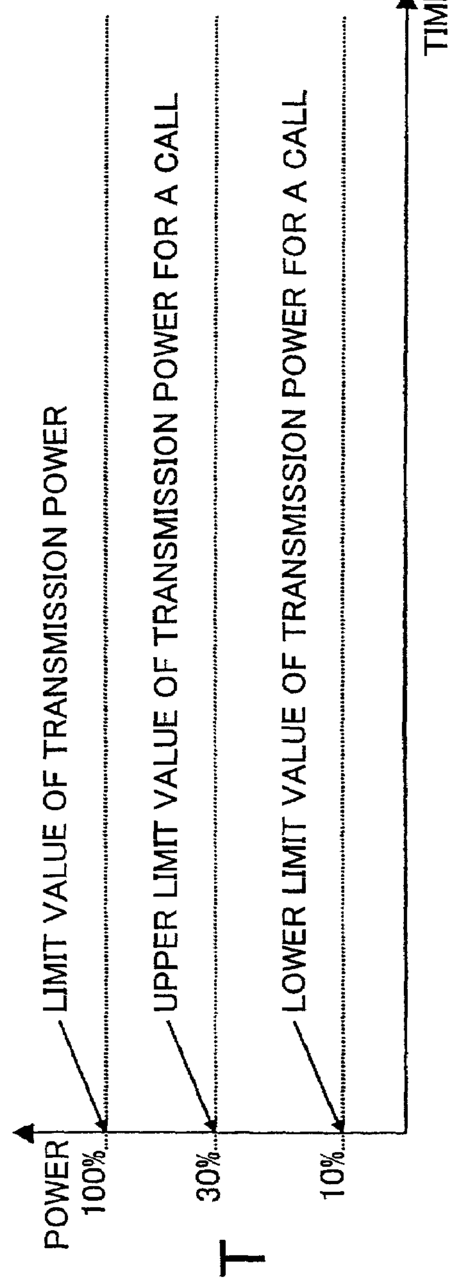
FIG. 3A is a graph schematically showing an example of an upper limit value and a lower limit value set for a call.
Figure 3B:
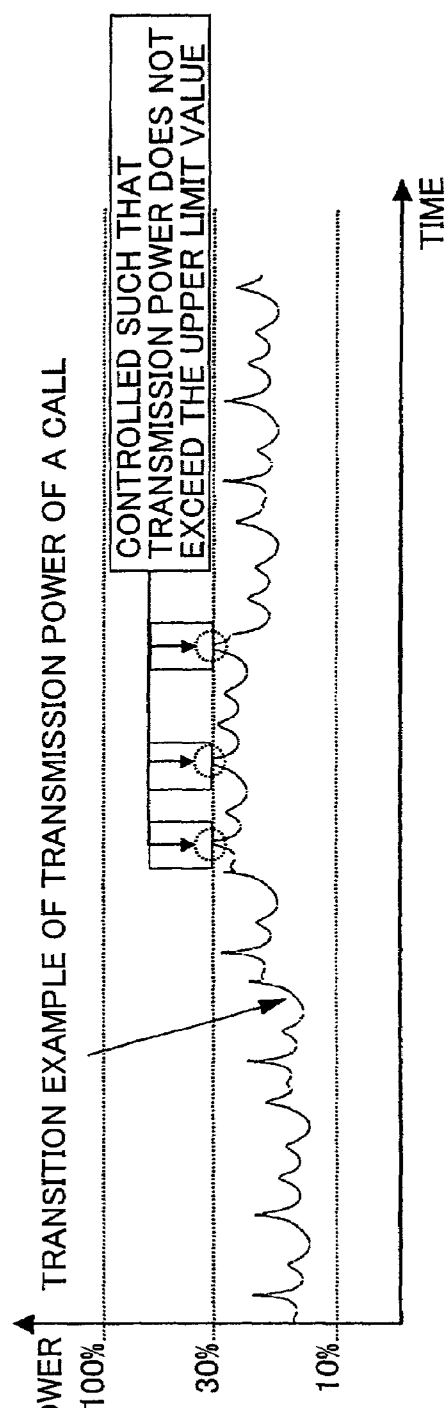
FIG. 3B is a graph showing an example of transition of transmission power with respect to time.
Figure 4B:
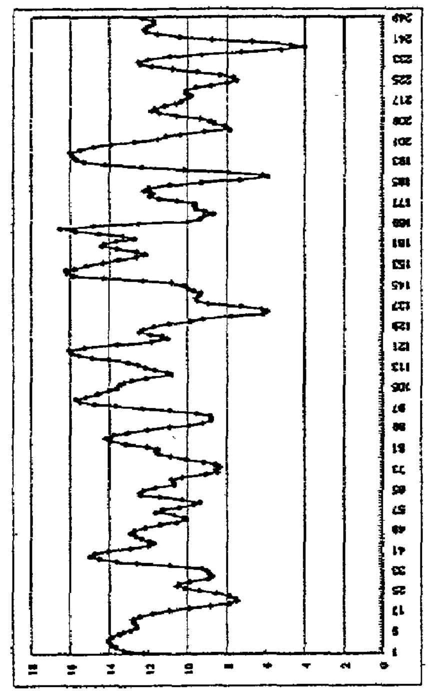
FIGS. 4A–4C shows graphs for explaining change of transmission signal when receiving transmission power control by a conventional transmission power control apparatus.
Figure 4C:
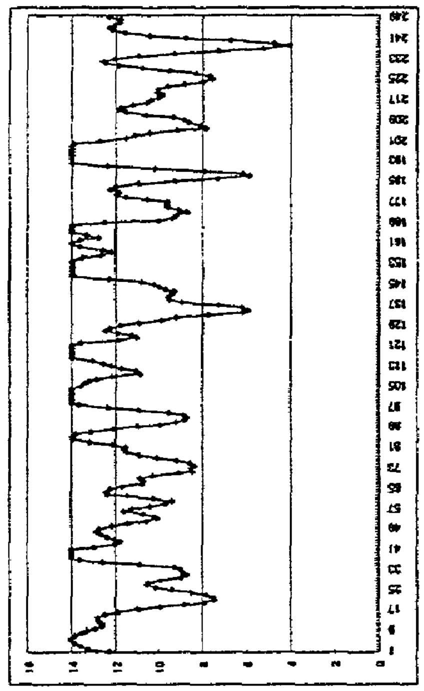
Figure 4A:
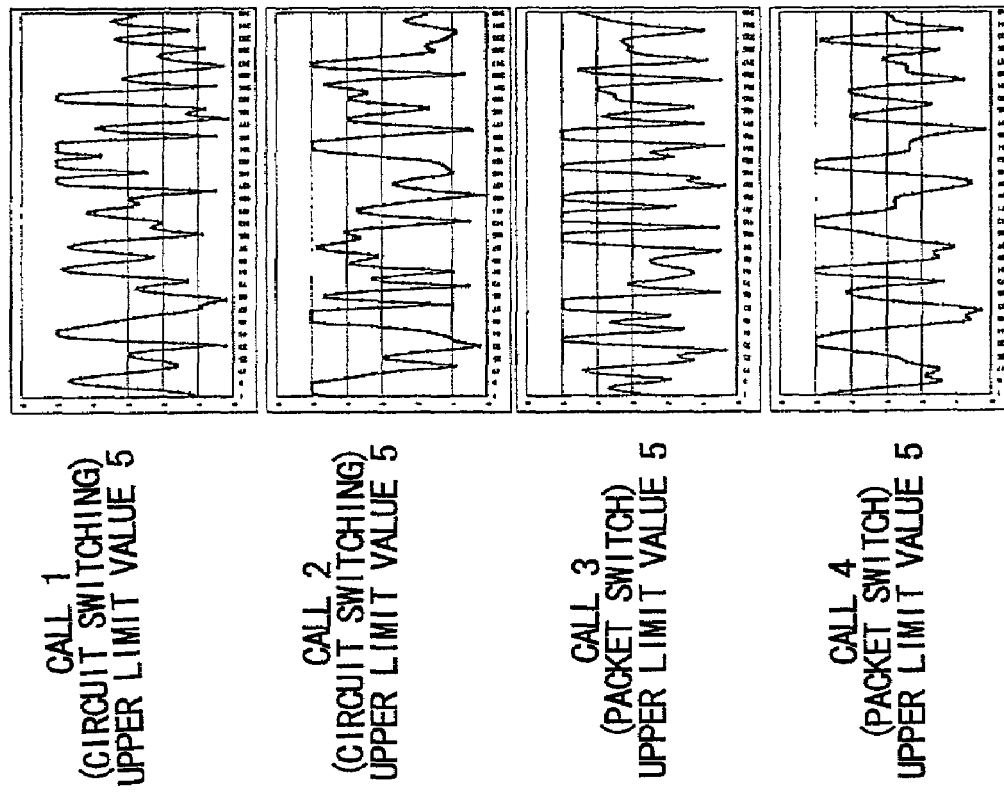
Figure 5:
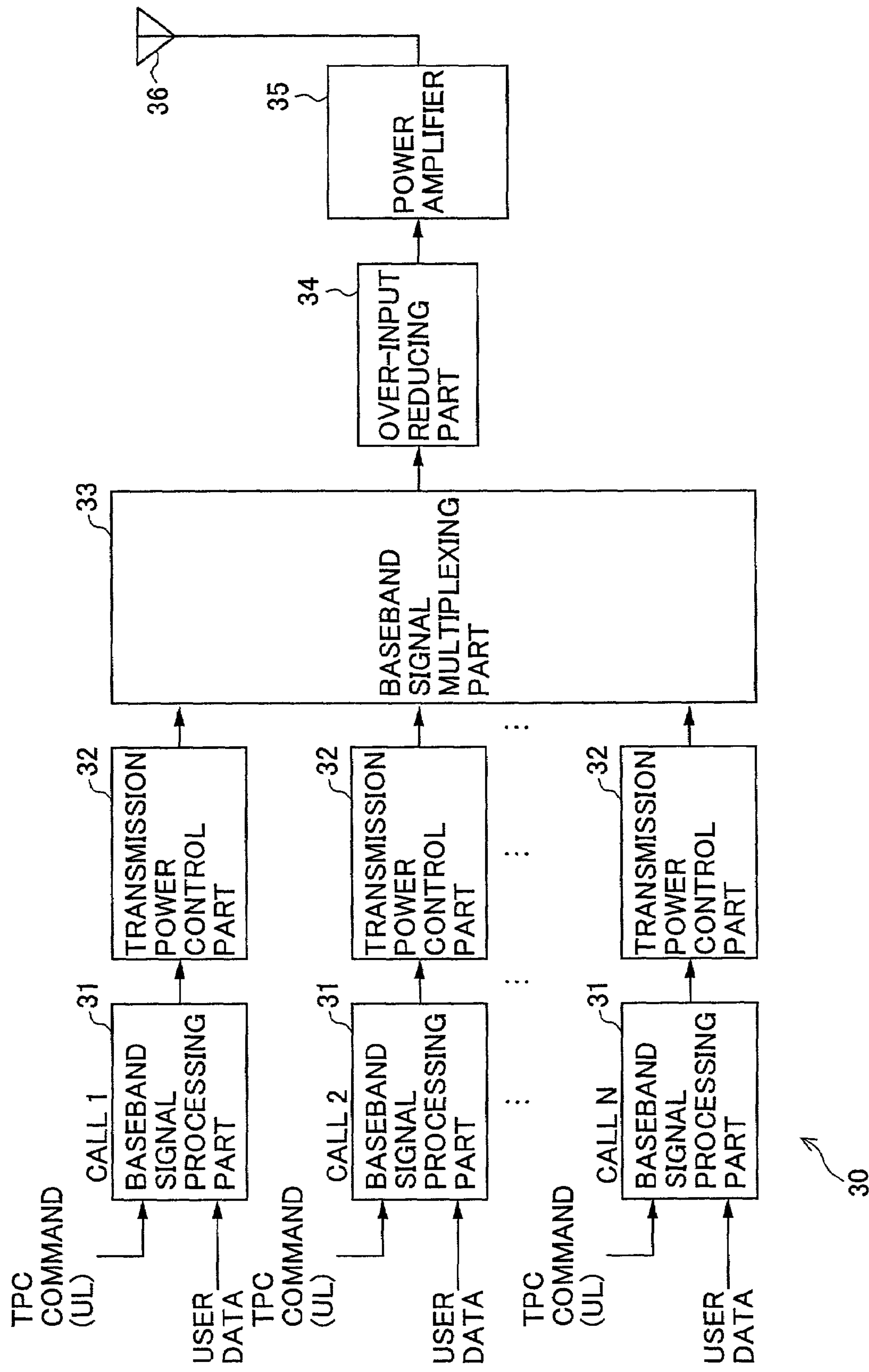
FIG. 5 is a block diagram of a conventional transmission power control apparatus 600.

The transmission power control of this embodiment will be described with reference to FIGS. 10A–10C. For the sake of easiness of comparison, the example of the transmission power change here is the same as one shown in FIG. 4A. In this example, four calls, calls 1–4 are connected, the calls 1 and 2 are the circuit switching type in which the upper limit value is set to be 5, and the calls 3 and 4 are packet switching type in which the upper limit value is set to be 3. When each transmission power of the calls change as shown in FIG.

10A while each call receives limitation by the upper limit value, the total sum of the transmission power of the calls becomes as shown in FIG. 10B.

If the maximum allowable input value of the transmission amplifier is 14, upper value of the transmission power shown in FIG. 10B is 14. When the transmission power value exceeds 14, the value is reduced to 14 by the baseband signal multiplexing/reducing part 105. FIG. 10C shows a graph after the total power is reduced. When comparing FIG. 10C with FIG. 4C, it can be understood that the ratio of transmission power reduction performed by the baseband signal multiplexing/reducing part 105 is decreased, that is, the probability of occurrence of the over-input decreases.

According to this embodiment, by setting the transmission power upper limit value of the packet switching type call being lower than the circuit switching type, the probability of occurrence of a state in which the transmission power is reduced below the maximum allowable input value of the power amplifier 106 decreases in the baseband signal multiplexing/reducing part 105. As a result, degradation of communication quality for the call of the circuit switching type can be prevented.

(Embodiment 1-2)

Figure 12:
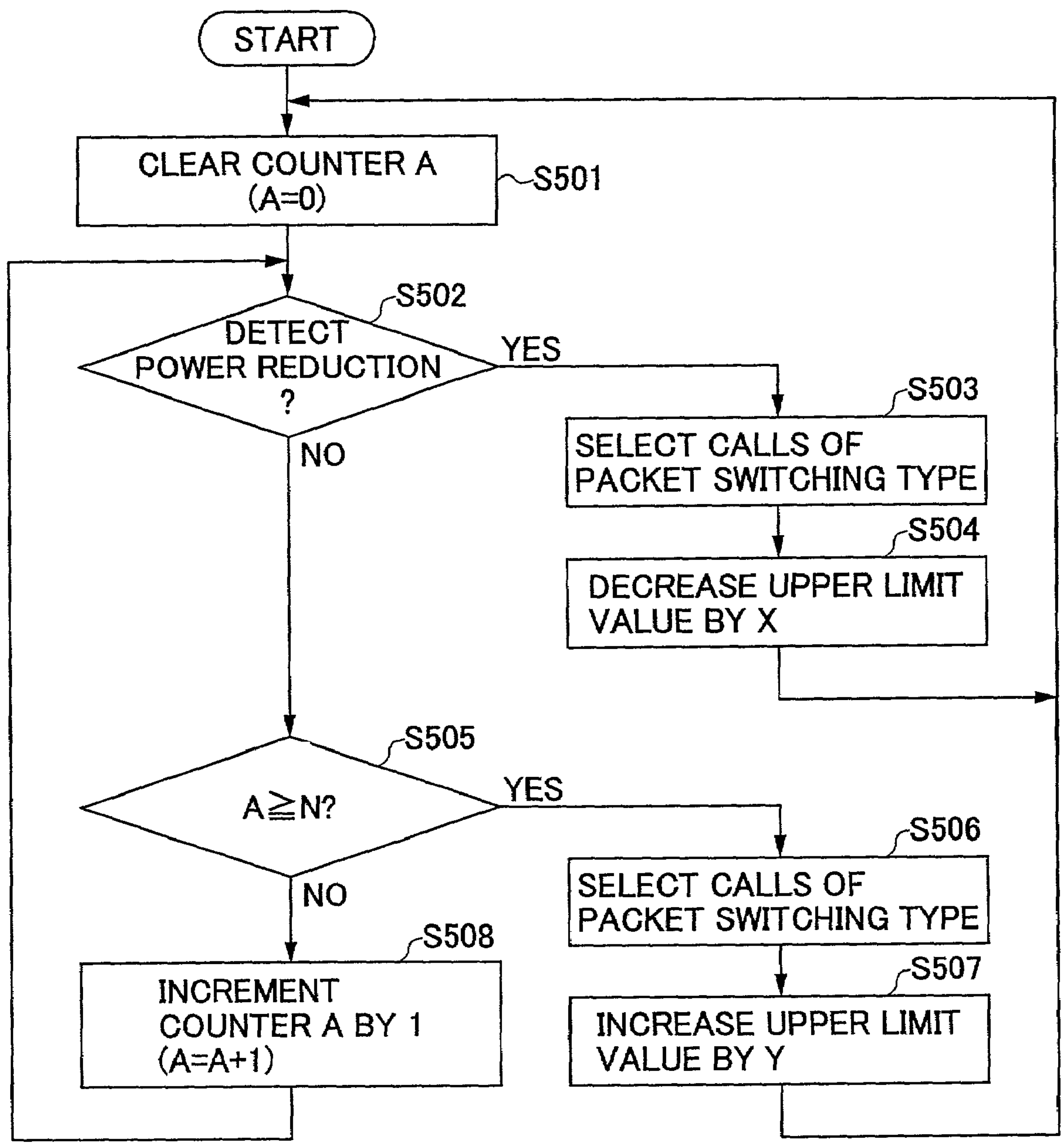
FIGS. 12 and 13 are flowcharts of call reestablishment process in the transmission power control apparatus 400 of the embodiment 1-2.
Figure 13:
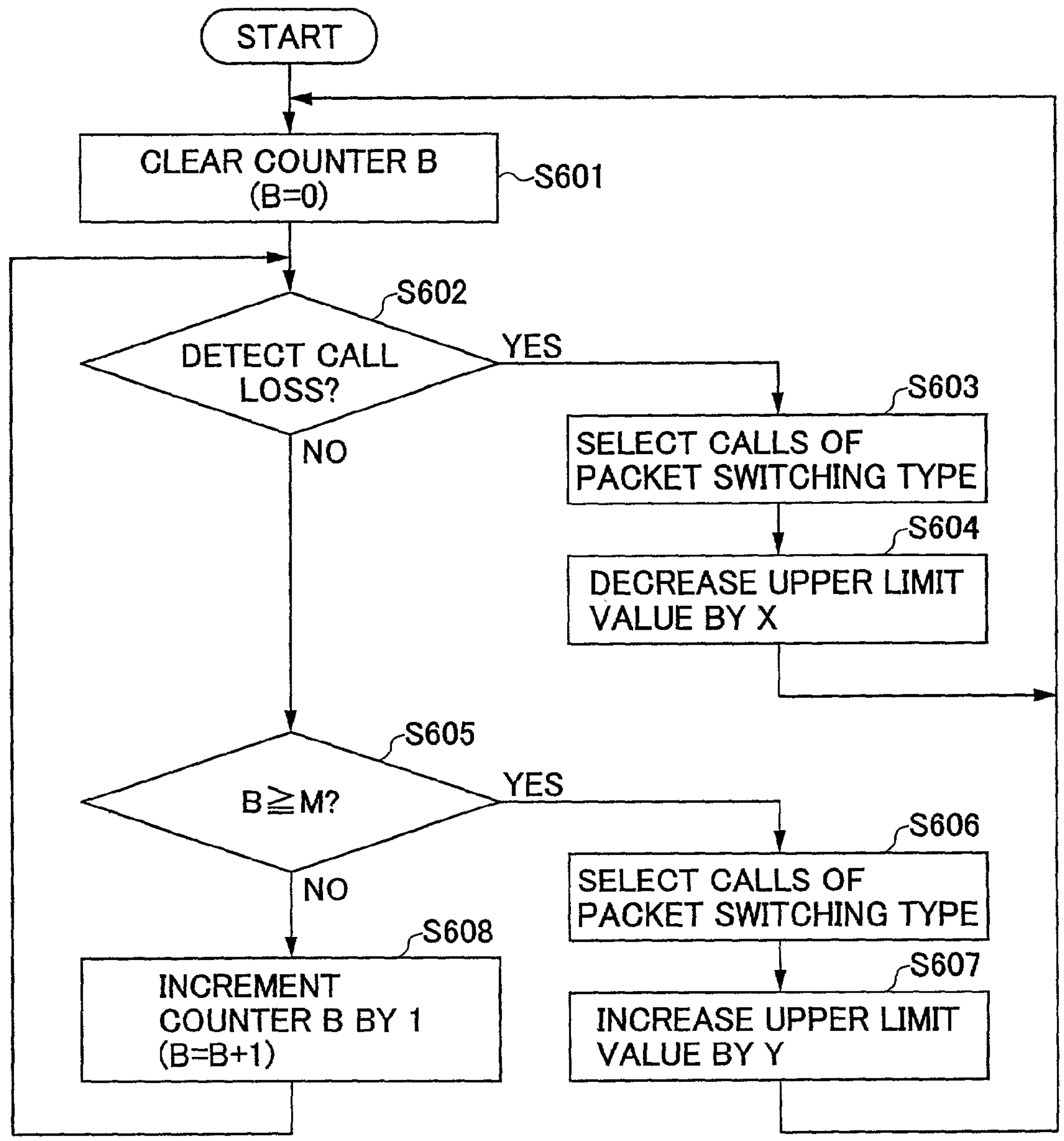

Next, a transmission power control apparatus of the embodiment 1-2 of the present invention will be described with reference to FIGS. 11–13. In this embodiment, in addition to setting the upper limit value for each call according to the embodiment 1-1, by changing the upper limit value adaptively in communication, it is prevented that the transmission power of the call of the packet switching type is reduced more than necessary, and it is prevented that the whole signals are reduced before the transmission amplifier due to inadequacy of reduction so that the call of the circuit switching type is affected.

Figure 11:
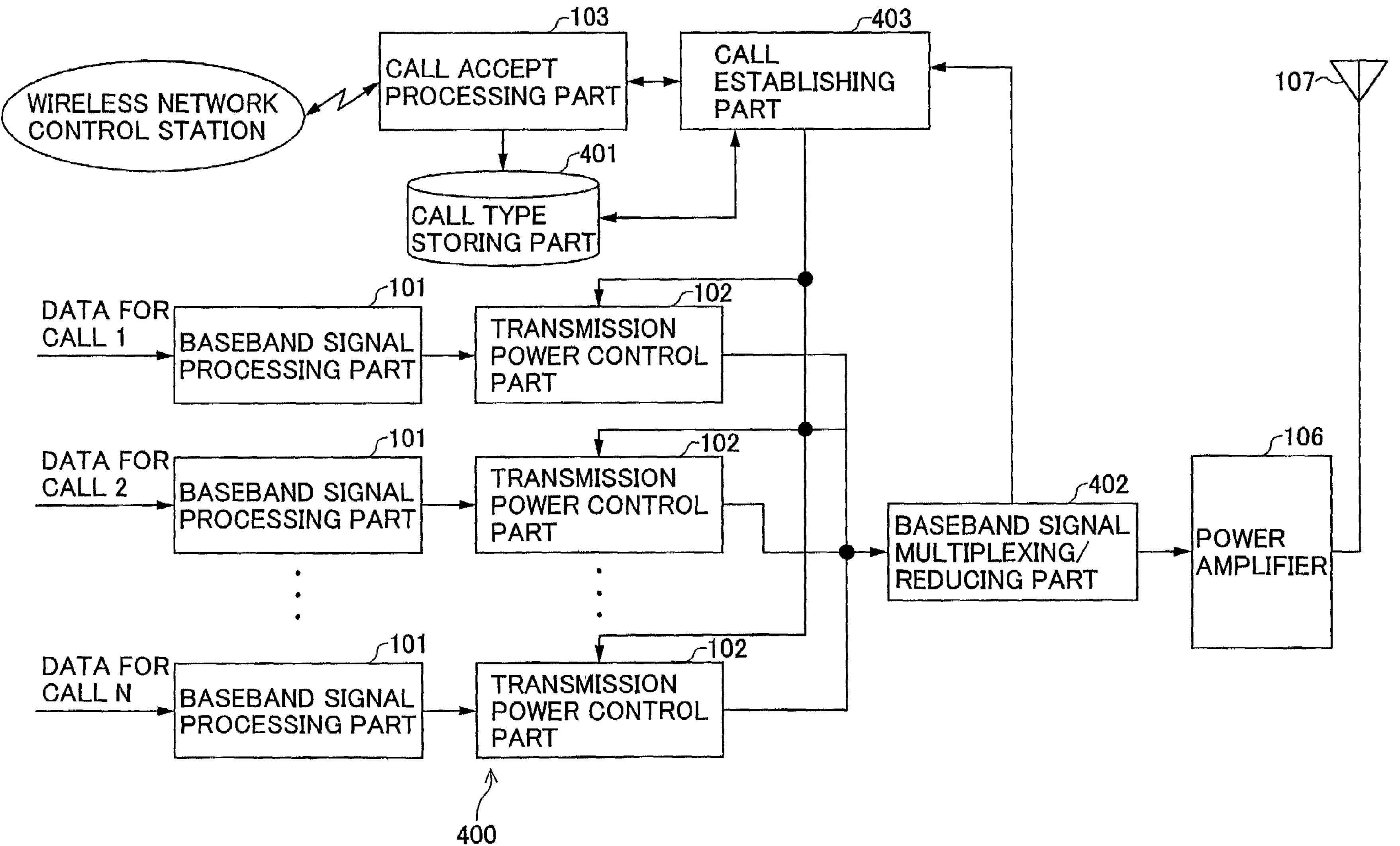
FIG. 11 shows a schematic block diagram of a transmission power control apparatus 400 of the embodiment 1-2.

FIG. 11 show a schematic block diagram of the transmission power control apparatus 400 of the embodiment 1-2. FIGS. 12 and 13 are flowcharts of call reestablishment process in the transmission power control apparatus 400 of the embodiment 1-2. For example, the transmission power control apparatus 400 is included in a base station in a wireless communication system. The same number is assigned to the same component as the transmission power control apparatus 100 of the embodiment 1-2.

An call type storing part 401 in the transmission power control apparatus 400 is a memory for example, and stores circuit type information of a call which is connected. That is, when a call is received, the circuit type information of the call is recorded, and the circuit type information of the call is deleted when the call is released. Thus, by accessing the call type storing part 401, it becomes possible to obtain a circuit type of a call which is connected.

When over-input of the transmission power is detected so that power reduction is performed, a baseband signal multiplexing/reducing part 402 notifies a call establishing part that over-input occurs.

When over-input occurs and reduction process is performed, the call establishing part 403 decreases the upper limit value for the call of the packet switching type which is set in the transmission power control part 102 by X in order to decrease probability that power reduction needs to be performed. When reduction is not performed for a predetermined time, the upper limit value is increased by Y in order to improve communication quality of the call of the packet switching type. If a current upper limit value is 30%, X=3% and Y=0.3%, for example.

Next, an upper limit reestablishment process in the transmission power control apparatus of this embodiment will be described by using FIG. 12.

In this process, a counter A on the value A is used. First, the counter A is cleared so that A=0 in step 501. Then, while occurrence of reduction process is monitored in step 502, when the reduction is detected, calls of the packet switching type are selected in step 503, and the upper limit of the calls is decreased by X. After that, the counter A is cleared again in step 501, and the monitoring of the occurrence of the reduction process continues in step 502.

Next, it is judged whether the reduction process does not occur for a predetermined period by comparing the value A with a predetermined value N in step 505. When the value A is equal to or more than N, calls of the packet switching type are selected in step 506, and the upper limit value for the calls is increased by Y. After that, the counter A is cleared again in step 501 and the monitoring of the occurrence of the reduction process continues in step 502.

When the value A is smaller than N, the counter A is incremented by 1 in step 508, and monitoring of occurrence of reducing process continues in step 502.

Although the upper limit of the call of the packet switching type is reestablished triggered by the occurrence of the reducing process in the above embodiment, it is also possible to use occurrence of call loss as the trigger. In the following, a case in which the occurrence of call loss is used as the trigger will be described by using FIG. 13. In this case, the occurrence of call loss is monitored by the call accept processing part 103.

In this case, a counter B on the value B is used. First, the counter B is cleared to B=0 in step 601. The occurrence of call loss is monitored in step 602. When call loss is detected, calls of the packet switching type are selected in step 603, and the upper limit value of the calls is decreased by X. After that, the counter B is cleared again in step 601, and monitoring of occurrence of call loss continues in step 602.

Next, it is judged whether the call loss does not occur for a predetermined period by comparing the value B with a predetermined value M in step 605. When the value B is equal to or more than M, calls of the packet switching type are selected in step 606, and the upper limit value for the calls is increased by Y. After that, the counter B is cleared again in step 601 and the monitoring of the occurrence of the call loss continues in step 602.

When the value B is smaller than M, the counter B is incremented by 1 in step 608, and monitoring of occurrence of call loss continues in step 602.

The upper limit reestablishment process by using the occurrence of the reducing process as the trigger and the upper limit reestablishment process by using the occurrence of call loss can be performed simultaneously as independent control loops.

As mentioned above, according to the transmission power control apparatus of this embodiment, the power upper limit value in transmission power control set for the call of the packet switching type can be changed triggered by occurrence of reducing process and/or occurrence of call loss. Therefore, the probability that the reducing process becomes necessary is decreased and communication quality of the call of the packet switching type can be improved.

(Embodiment 1-3)

Next, a transmission power control method of the embodiment 1-3 of the present invention will be described by using FIGS. 14 and 15. As mentioned before, in the conventional transmission power control, the received SIR and the target SIR are compared for generating the transmission power control information to the other station. An equivalent process by using the upper limit value in the base station of the embodiments 1-2 and 1-3 can be performed by changing the transmission power control information itself sent from the mobile station by changing the target SIR stored in the mobile station. In this embodiment, a control target SIR is determined according to the circuit type of a call, and the determined control target SIR is sent to the mobile station corresponding to the call so that the mobile station uses the control target SIR for comparison with the received SIR.

Figure 14:
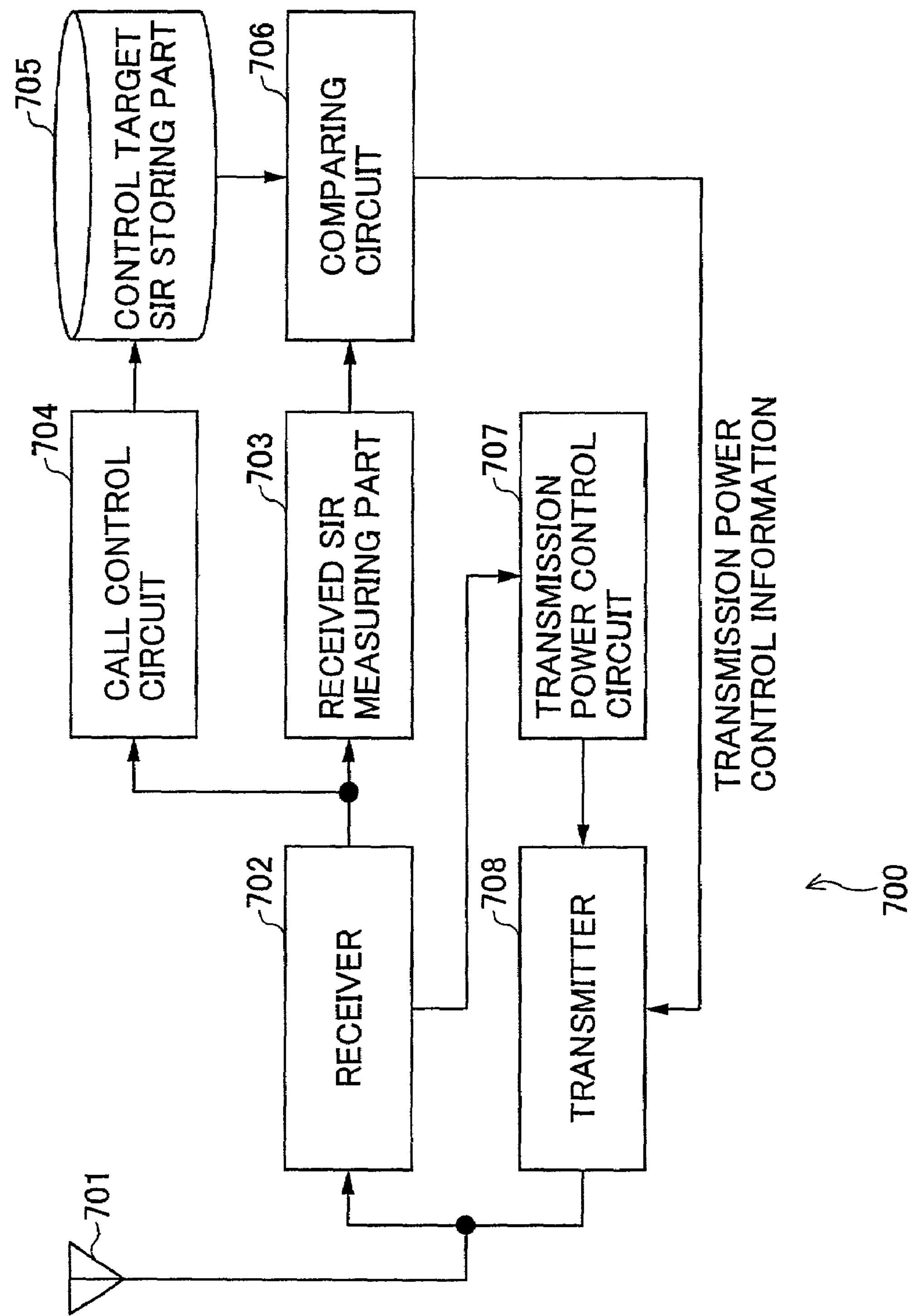
FIG. 14 show a schematic block diagram of a mobile station 700 of the embodiment 1-3 of the present invention.
Figure 15:
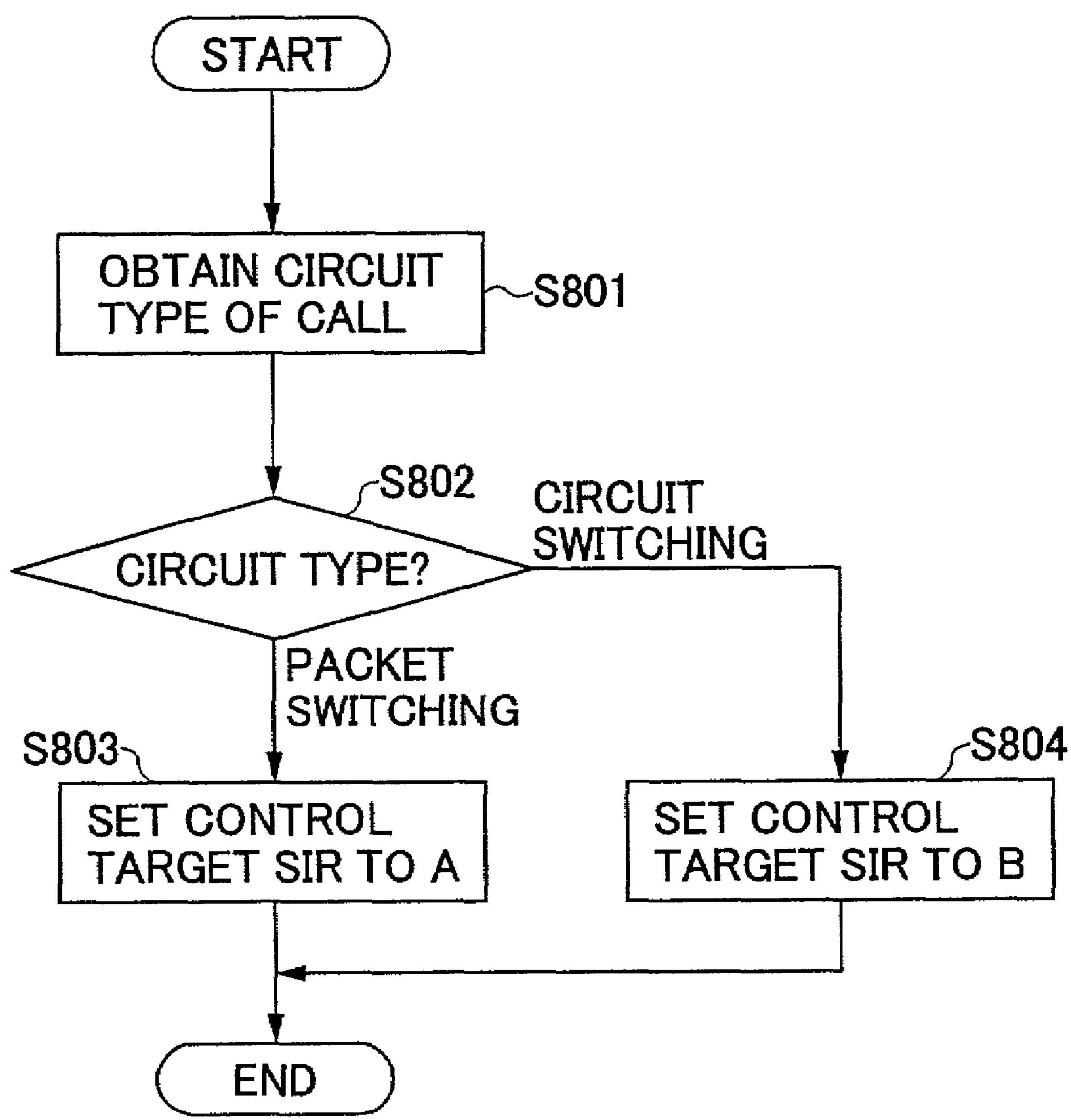
FIG. 15 is a flowcharts of call reestablishment process in the transmission power control apparatus of the embodiment 1-3.

FIG. 14 show a schematic block diagram of the mobile station 700 of the embodiment 1-3 of the present invention. FIG. 15 is a flowcharts of call reestablishment process in the transmission power control apparatus of the embodiment 1-3. The transmission power control apparatus of the embodiment 1-3 has the same configuration as that of the embodiment 1-1. The transmission power control apparatus is included in a base station in a wireless communication system.

First, the configuration of the mobile station will be described. The mobile station 700 includes an antenna 701, a receiver 702, a received SIR measuring part 703, a call control circuit 704, a control target SIR storing part 705, a comparing circuit 706, a transmission power control circuit 707, and a transmitter 708.

The receiver 702 receives a signal sent from the base station via the antenna 701. The received SIR measuring part 703 measures SIR of the received signal.

The call control circuit 704 extracts the control target SIR from the received signal sent from the base station and stores it in the control target SIR storing part 705. The control target SIR storing part 705 is a memory for example, and stores the control target SIR sent from the base station.

The comparing circuit 706 compares the received SIR with the control target SIR, and generates the transmission power control information to the base station according to the result. The generated transmission power control information is sent to the base station via the antenna 701 by the transmitter 708.

Next, the transmission power control method of this embodiment will be described. When the transmission power control apparatus receives a call origination request from the mobile station, the call accept processing part 103 obtains the circuit type of the call. Then, the call establishing part 104 determines the control target SIR according to the circuit type. FIG. 15 shows the control target SIR determining process according to this embodiment.

When the call origination request is received and the control target SIR determining process for the call is started, information on the circuit type obtained by the call accept processing part 103 is input into the call establishing part 104 in step 801.

Next, the circuit type is determined by the call establishing part 104 in step 802. As mentioned before, the circuit type is classified into the packet switching type and the circuit switching type. A control target SIR A is assigned to a call of the packet switching type, and a control target SIR B is assigned to a call of the circuit switching type in steps 803 and 804.

Thus determined control target SIR of the call is sent, to the mobile station via the antenna 107 after transmission processing. The control target SIR received by the mobile station is stored in the control target SIR storing part 705 by the call control circuit 704. After that, the control target SIR is used as the target SIR for comparing processing in the comparing circuit 706.

In this embodiment, the control target SIRs A and B are set such that $A<B$ is satisfied. The control target SIR for transmission power control for the call of the packet switching type is set to be lower than the value for the circuit switching type, for example, such that $A=3$, $B=5$.

According to this embodiment, by setting the control target SIR of the packet switching type call which has relatively high tolerance to error being lower than the circuit switching type, the probability of occurrence of a state in which the transmission power is reduced below the maximum allowable input value of the power amplifier 106 decreases in the baseband signal multiplexing/reducing part 105. As a result, degradation of communication quality for the call of the circuit switching type can be prevented.

(Embodiment 1-4 )

Next, a transmission power control apparatus of the embodiment 1-4 of the present invention will be described with reference to FIGS. 16–17. In this embodiment, in addition to setting the control target SIR for each call according to the embodiment 1-3, by changing the control target SIR adaptively in communication, it is prevented that the transmission power of the call of the packet switching type is reduced more than necessary, and it is prevented that the whole signals are reduced before the transmission amplifier due to inadequacy of reduction so that the call of the circuit switching type is affected.

Figure 16:
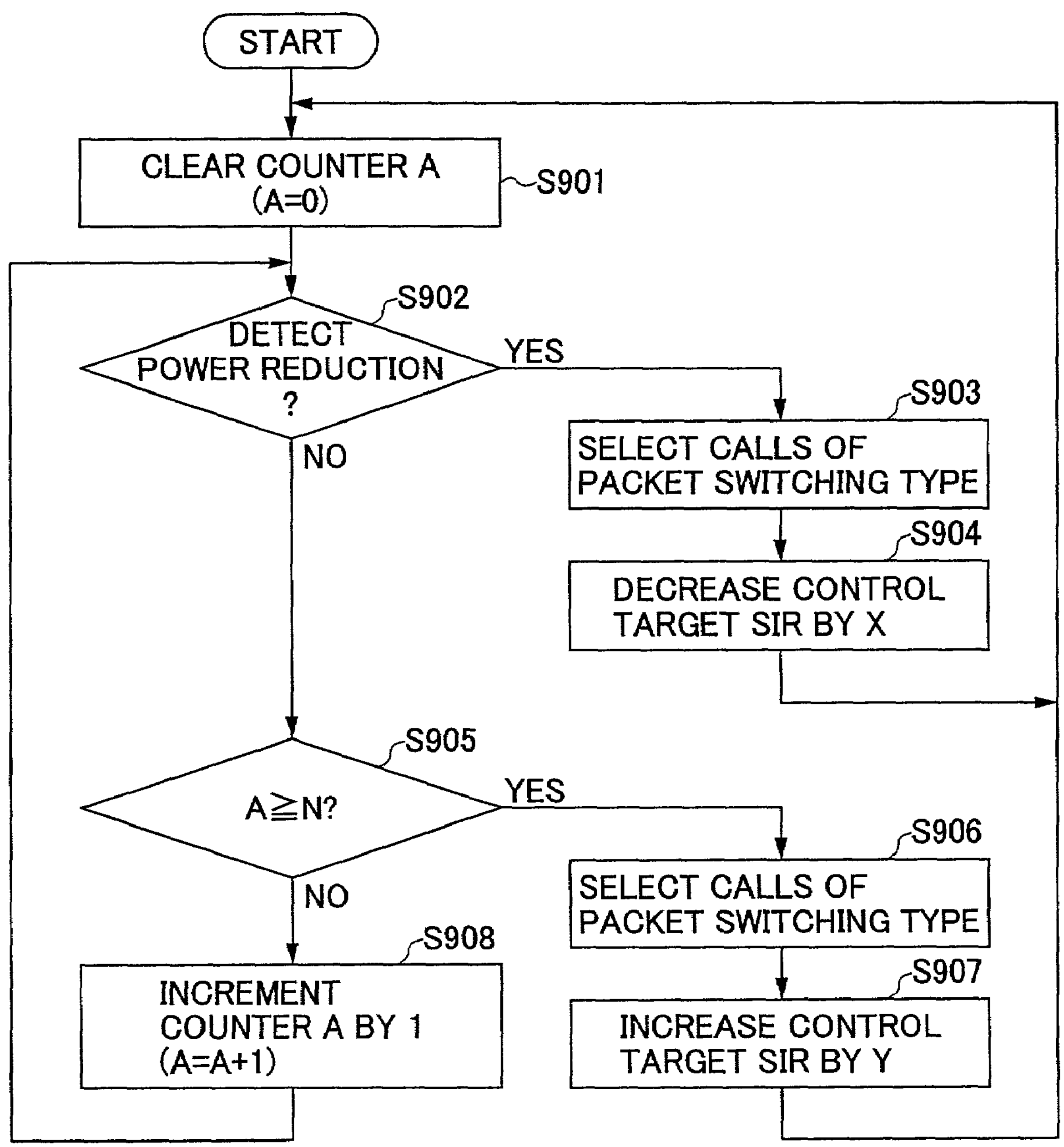
FIGS. 16 and 17 are flowcharts of control target SIR reestablishment process in the, transmission power control apparatus of the embodiment 1-4.
Figure 17:
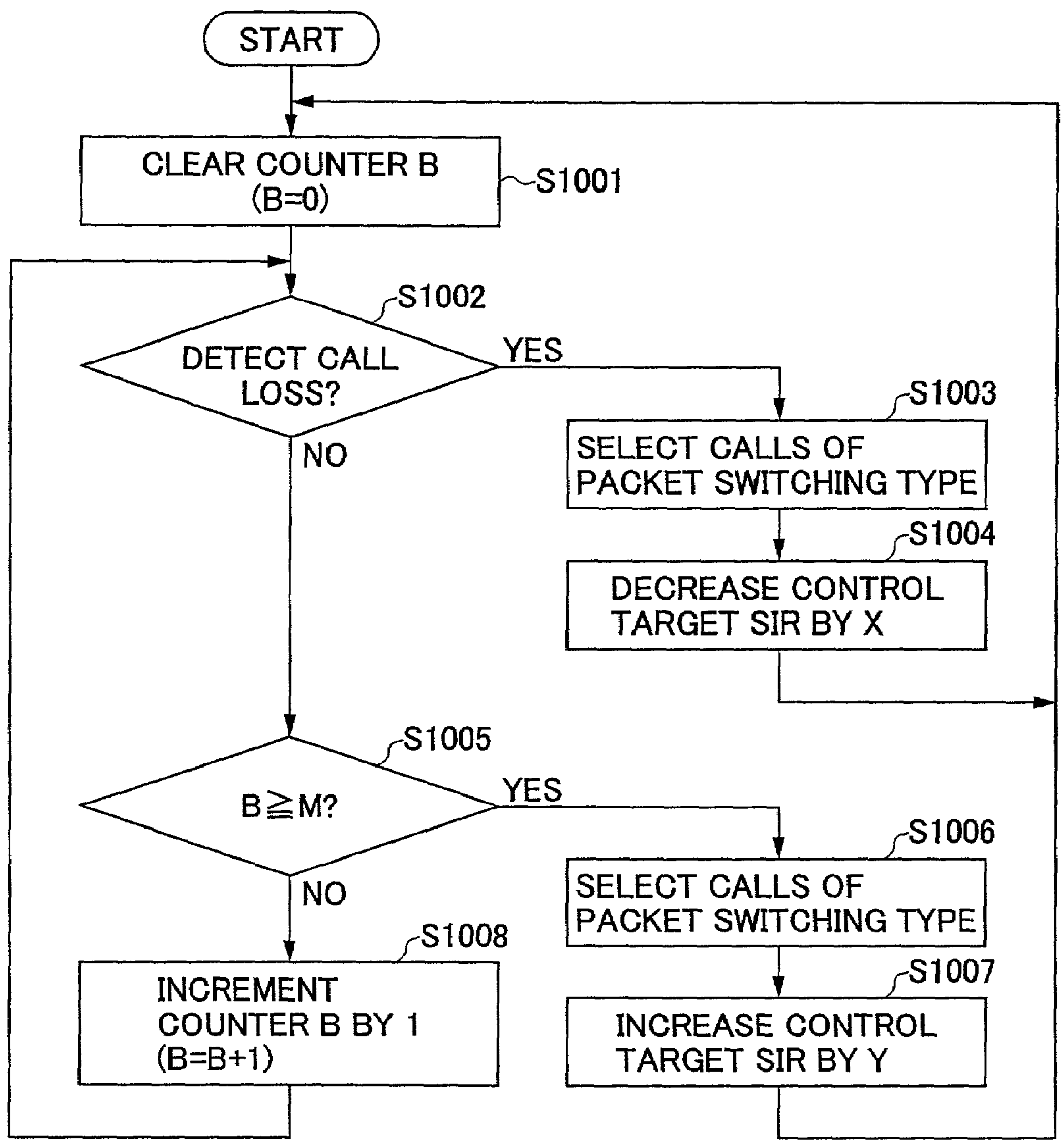

FIGS. 16 and 17 are flowcharts of control target SIR reestablishment process in the transmission power control apparatus of the embodiment 1-4. The transmission power control apparatus of this embodiment has the same configuration as that of the embodiment 1-2, and the mobile station of this embodiment has the same configuration as that of the embodiment 1-3. For example, the transmission power control apparatus is included in a base station in a wireless communication system.

First, the control target SIR reestablishment process in the transmission power control apparatus of this embodiment will be described by using FIG. 16 which shows a case in which the occurrence of reduction process is used as a trigger.

In this process, a counter A on the value A is used. First, the counter A is cleared so that $A=0$ in step 901. Then, while occurrence of reduction process is monitored in step 902, when the reduction is detected, calls of the packet switching type are selected in step 903, and the control target SIR of the calls is decreased by X. After that, the counter A is cleared again in step 901, and the monitoring of the occurrence of the reduction process continues in step 902.

Next, it is judged whether the reduction process does not occur for a predetermined period by comparing the value A with a predetermined value N in step 905. When the value A is equal to or more than N, calls of the packet switching type are selected in step 906, and the control target SIR for the calls is increased by Y. After that, the counter A is cleared again in step 901 and the monitoring, of the occurrence of the reduction process continues in step 902.

When the value A is smaller than N, the counter A is incremented by 1 in step 908, and monitoring of occurrence of reducing process continues in step 902.

Next, a process for a case where call loss is used as a trigger will be described by using FIG. 17.

In this case, a counter B on the value B is used. First, the counter B is cleared to $B=0$ in step 1001. The occurrence of call loss is monitored in step 1002. When call loss is detected, calls of the packet switching type are selected in step 1003, and the control target SIR of the calls is decreased by X. After that, the counter B is cleared again in step 1001, and monitoring of occurrence of call loss continues in step 1002.

Next, it is judged whether the call loss does not occur for a predetermined period by comparing the value B with a predetermined value M in step 1005. When the value B is equal to or more than M, calls of the packet switching type are selected in step 1006, and the control target SIR for the calls is increased by Y. After that, the counter B is cleared again in step 1001 and the monitoring of the occurrence of the call loss continues in step 1002.

When the value B is smaller than M, the counter B is incremented by 1 in step 1008, and monitoring of occurrence of call loss continues in step 1002.

The control target SIR reestablishment process by using the occurrence of the reducing process as the trigger and the control target SIR reestablishment process by using the occurrence of call loss can be performed simultaneously as independent control loops.

As mentioned above, according to the transmission power control apparatus of this embodiment, the power control target SIR in transmission power control set for the call of the packet switching type can be changed triggered by occurrence of reducing process and/or occurrence of call loss. Therefore, the probability that the reducing process becomes necessary is decreased and communication quality of the call of the packet switching type can be improved.

In the above-mentioned embodiments, the transmission power control apparatus is not necessarily included in the base station. The transmission power control apparatus can be provided anywhere in the system as long as the transmission power control apparatus controls the transmission power of the base station in the wireless communications system.

In addition, the present invention is not limited to the above-mentioned CDMA. The present invention can also be applied to a case where a technology called common amplifying for combining and amplifying a plurality of signals sent by different wireless frequencies is applied in FDMA (frequency division multiple access) and TDMA (time division multiple access).

In addition, in the above-mentioned embodiments, a case in which transmission power control of closed loop type based on SIR is performed has been described. However, the present invention can be also applied to transmission power control of outer loop type based on communication quality. In this case, since transmission power control information is generated according to difference between received quality and target quality, the process of the present invention can be realized by determining control target quality instead of the control target SIR for sending to the mobile station. In other words, the control target value is not limited to SIR.

SECOND EMBODIMENTS

In the following, the second embodiments which includes an embodiment 2-1 and an embodiment 2-2 will be described.

(Embodiment 2-1 )

Figure 18:
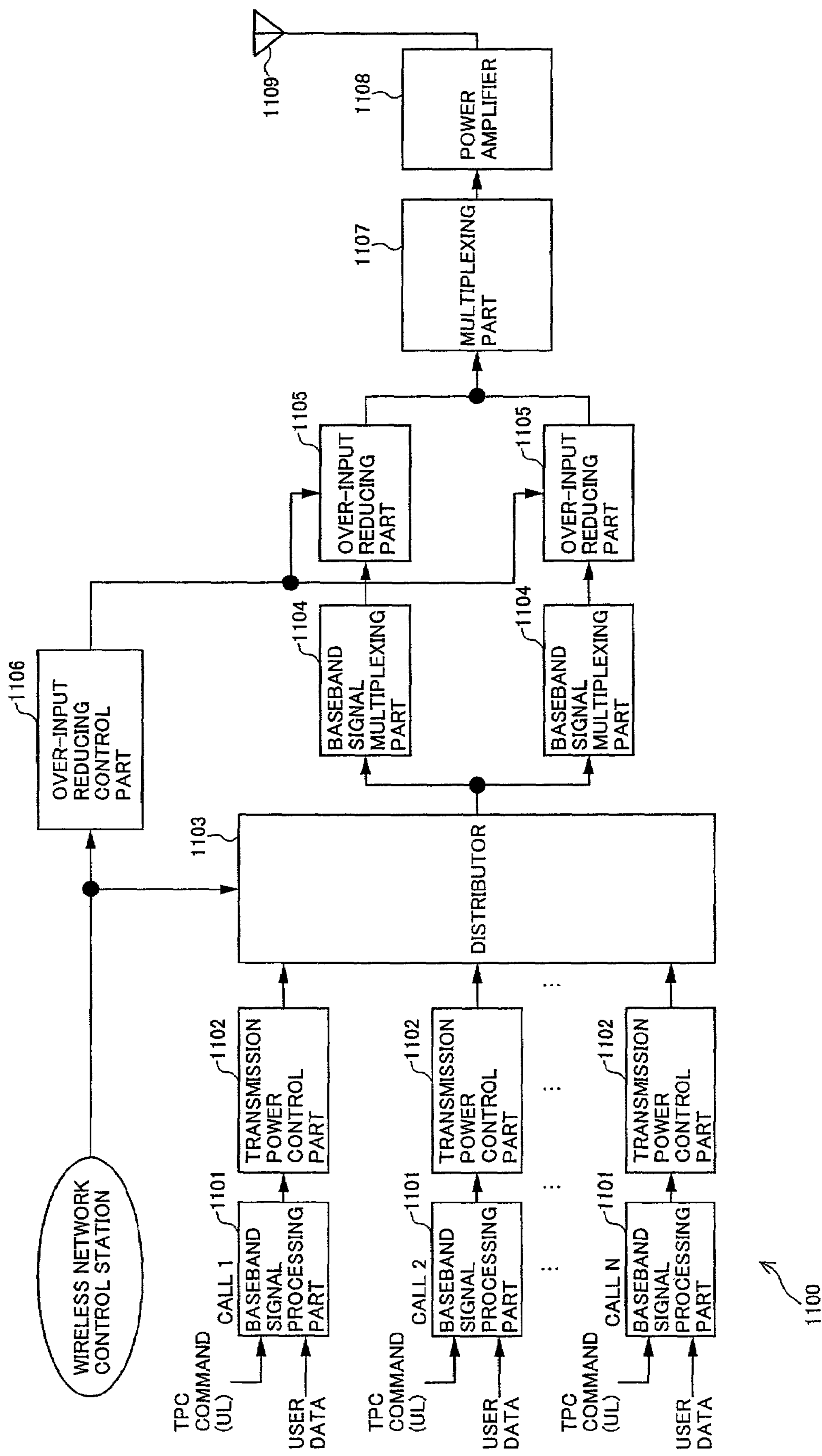
FIG. 18 is a schematic diagram of a transmission power control apparatus 1100 of the embodiment 2-1 of the present invention.

A transmission power control apparatus 1100 and the transmission power reduction method of the embodiment 2-1 of the present invention will be described with reference to FIG. 18. FIG. 18 is a schematic diagram showing a part relating to the present invention in the transmission power control apparatus 1100 of the embodiment 2-1 of the present invention. The transmission power control apparatus 1100 is characterized by a plurality of baseband signal multiplexing parts. The transmission power control apparatus 1100 is included in a base station in a wireless communication system for example.

First, the configuration will be described. The transmission power control apparatus 1100 includes a plurality of (for example N) baseband signal processing parts 1101, transmission power control parts 1102 each provided after the baseband signal processing part 1101, a distributor 1103 which divides the baseband transmission signals of each call into groups, a plurality of (2 in this case) baseband signal multiplexing parts 1104, over-input reducing parts 1105 each of which is a limiter for example and each of which is provided after the baseband signal multiplexing part 1104, an over-input reducing control part 1106 for providing a threshold (upper limit value), a multiplexing part 1107 for multiplexing outputs from the over-input reducing parts 1105, a power amplifier 1108 and an antenna 1109.

The baseband signal processing part 1101 performs baseband-processing on user data to be transmitted for each call.

Each transmission power control part 1102 increases or decreases amplitude of a transmission signal of a call on which baseband processing was performed on the basis of a TPC command from up-link.

The distributor 1103 obtains information on circuit types of each call from the outside, for example, from a wireless network control station, classifies the transmission signals of each input channel into a plurality of groups according to the circuit type. Then, the distributor outputs the transmission signal to a corresponding baseband signal multiplexing part 1104 according to the group for the transmission signal. In this embodiment, the signals are classified into two groups as an example, and the classification is based on whether the circuit type is the circuit switching type or the packet switching type.

Each baseband signal multiplexing part 1104 multiplexes the input baseband transmission signals. In this embodiment, since the signals are classified into two groups, two baseband signal multiplexing parts are provided. Although any number of baseband signal multiplexing parts 1104 can be provided, it is preferable that the number is more than one since the transmission signals of the channels are classified into a plurality of groups.

The over-input reducing part 1105 is a limiter for example, and, is provided after each baseband signal multiplexing part 1104. By using a threshold (upper limit value) on amplitude which can be controlled from the outside, the over-input reducing part 1105 reduces amplitude of an input signal to be below the threshold. In this embodiment, the over-input reducing part 1105 reduces the amplitude of the multiplexed transmission signal for a group by using the threshold provided from the over-input reducing control part 1106 as an upper limit value.

The over-input reducing control part 1106 can determine the threshold by using any method as long as the amplitude of transmission signal in which signals of every call are multiplexed by the multiplexing part 1107 becomes equal to or smaller than an allowable input value of the power amplifier 1108. For example, assuming that the allowable input power value of the power amplifier 1108 is 1, the threshold can be determined such that power values of each group become 0.2 and 0.8 respectively.

In this embodiment, the over-input reducing control part 1106 does not reduce the amplitude for the group of the circuit switching type, and only reduces the amplitude of the group of the packet switching type if this is possible. Accordingly, the transmission power is reduced to equal to or smaller than the allowable input value of the power amplifier 1108.

The multiplexing part 1107 multiplexes the outputs of the over-input reducing parts 1105, and outputs the multiplexed signal to the power amplifier 1108. The power amplifier 1108 amplifies the multiplexed transmission signal by a constant gain. The antenna 1109 radiate the transmission signal.

Next, the operation of the transmission power control apparatus 1100 will be described. A transmission signal of each call which is baseband-processed by the baseband signal processing part 1101 and is TPC-processed by the transmission power control part 1102 is input into one of the baseband signal multiplexing parts 1104 by the distributor 1103 so that the signal is classified into a group of the circuit switching type or the packet switching type.

The transmission signals multiplexed by the baseband signal multiplexing part 1104 for each group is output to the multiplexing part 1107 after the amplitude is reduced below a threshold by the over-input reducing part 1105 for each group. The threshold is provided from the over-input reducing control part 1106, and may be different for each group. That is, when transmission power from the base station should be reduced (that is, when over-input to the transmission amplifier occurs), the transmission power reducing process can be performed by different reducing ratio for each group.

According to this embodiment, the transmission signals of calls are divided into a plurality of groups, and transmission power reduction at the time of occurrence of over-input is performed for each group. Thus, transmission power reduction of a group does not affect to transmission power of calls of other groups. That is, transmission power reduction of a part of calls does not affect transmission power of other calls. Therefore, range of calls which are affected each other by transmission power reduction is limited. Therefore, it can be prevented to deteriorate communication quality of every call by transmission power reduction.

Therefore, as mentioned above, calls are classified into groups of the circuit switching type and the packet switching type, and, only transmission power of the group of the packet switching type which has relatively larger tolerance to error is reduced when over-input occurs, and the transmission power of the group of the circuit switching type requiring real-time processing for which degradation of communication quality is hardly allowed is not reduced. Accordingly, transmission power can be reduced while the communication quality of calls of the circuit switching type is maintained.

In the above-mentioned example, although the calls are classified into two groups, the number of the groups may take any number. For example, four processing systems each of which includes the baseband signal multiplexing part 1104 and the following over-input reducing part 1105 can be provided such that the number of groups becomes four in which the calls of the circuit switching type are further classified into urgent voice communication and other communication and the calls of the packet switching type are classified into calls having long delay time and calls having short delay time, and the reducing ratio of transmission power is changed in stages. As a result, fine control becomes possible.

(Embodiment 2-2 )

Figure 20:
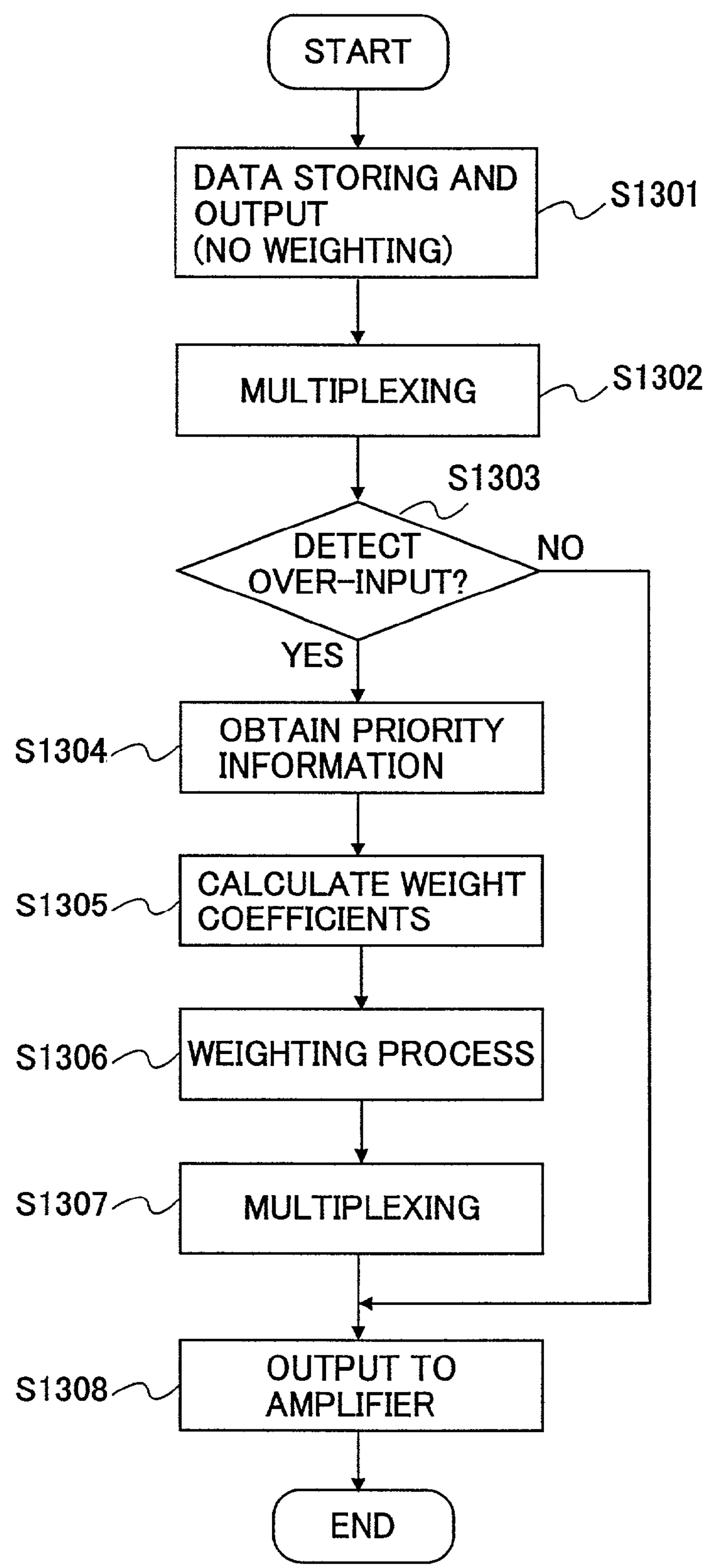
FIG. 20 is a flowchart showing the transmission power control method of the transmission power control apparatus 1200 of the embodiment 2-2 of the present invention.
Figure 21:
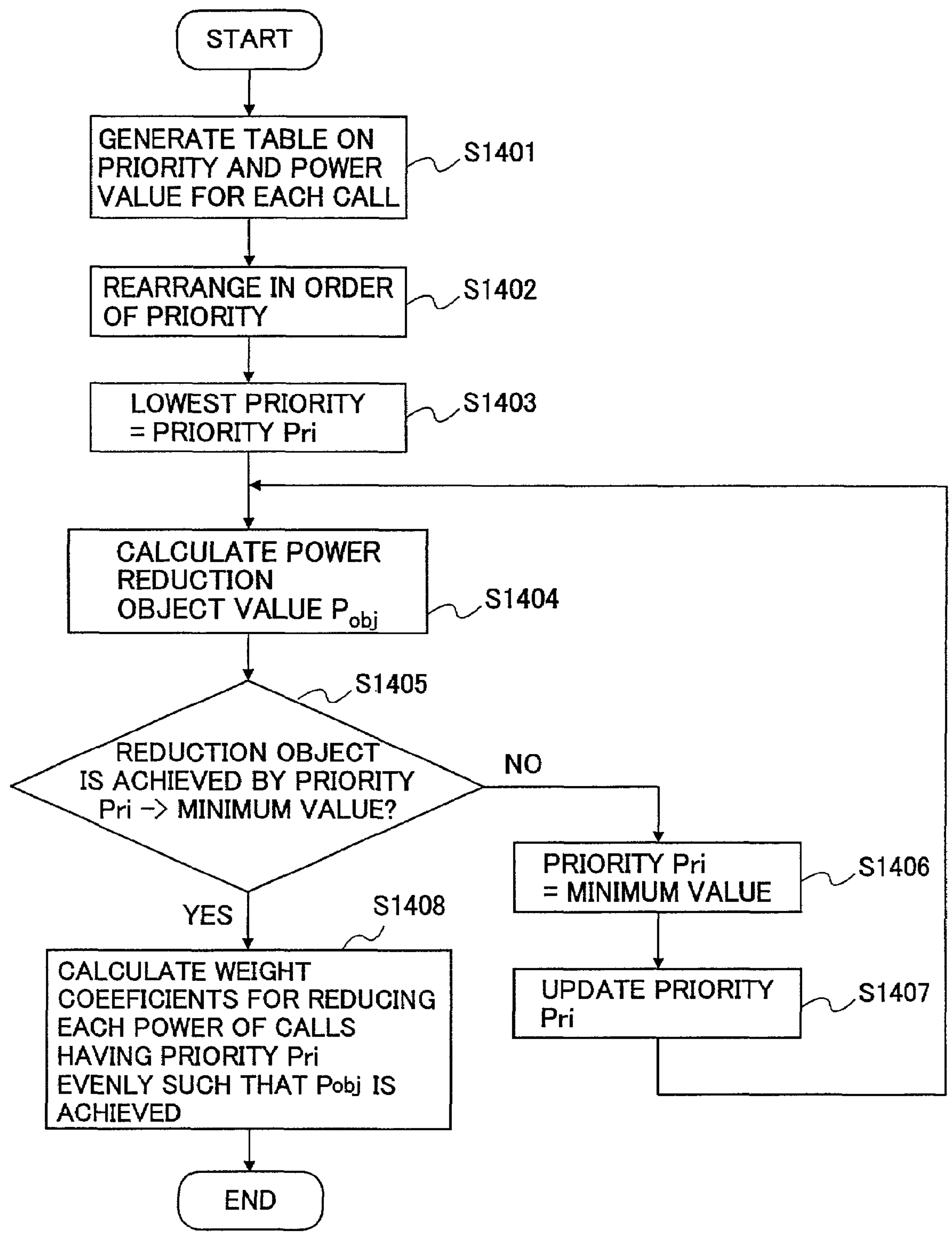
FIG. 21 shows a detailed flowchart of a transmission power reducing method in the transmission power control method.
Figure 22:
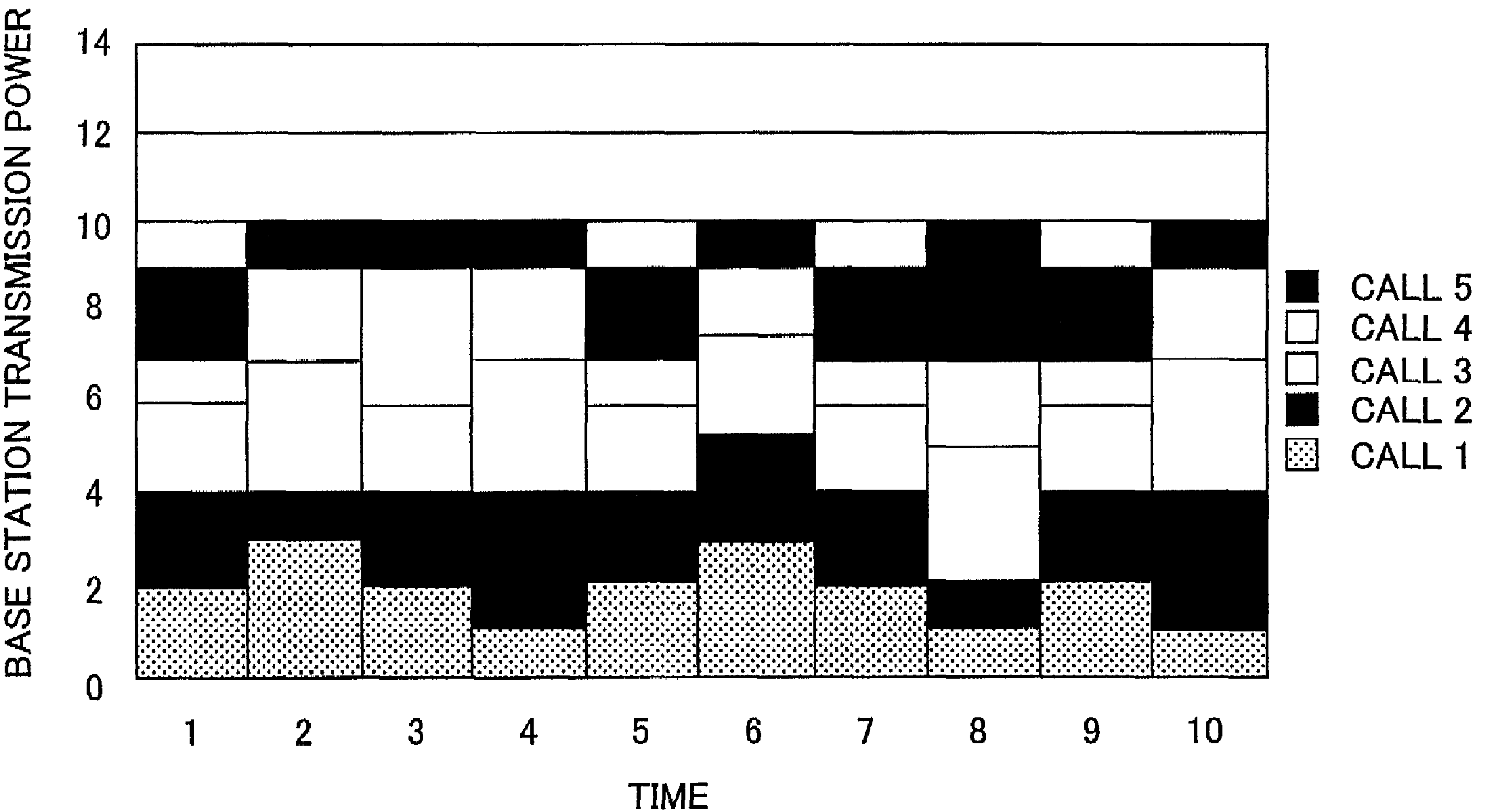
FIG. 22 is a graph showing a case in which transmission power reducing process is performed for base station transmission power by the transmission power control apparatus 1200 of the embodiment 2-2.

Next, a transmission power control apparatus 1200 and a transmission power reducing method of the embodiment 2-2 of the present invention will be described by using FIGS. 19–22. FIG. 19 is a schematic block diagram showing a part of the transmission power control apparatus 1200 relating to the embodiment 2-2 of the present invention. FIG. 20 is a flowchart showing the transmission power control method of the transmission power control apparatus 1200 of the embodiment 2-2 of the present invention. FIG. 21 shows a detailed flowchart of a transmission power reducing method in the transmission power control method. FIG. 22 is a graph showing a case in which transmission power reducing process is performed for base station transmission power by the transmission power control apparatus 1200 of this embodiment. The transmission power control apparatus 1200 of this embodiment reduces the transmission power by assigning weight to amplitude of transmission signal of each call. The transmission power control apparatus is included in a base station in a wireless communication system for example.

This embodiment is modified from the embodiment 2-1 which performs group classification. That is, in the embodiment 2-1, control which reflects characteristics of each call more finely can be performed by increasing systems each of which includes the baseband signal multiplexing part 1104 and the following over-input reducing part 1105. Therefore, it is easy to implement, but, a demerit arises in that the size of the apparatus becomes large. Thus, in this embodiment, priorities are determined on the basis of circuit characteristics for each call, and reducing ratio of transmission power of each call is determined according to the priority such that the transmission power reduction does not deteriorates communication quality of each call (especially, calls of the circuit switching type).

First, the configuration of the transmission power control apparatus 1200 will be described by using FIG. 19. The same number is assigned to the same component of the transmission power control apparatus 1100 of the embodiment 2-1. The transmission power control apparatus 1200 includes a plurality of (for example N) baseband signal processing parts 1101, transmission power control parts 1102 each provided after the baseband signal processing part 1101, a power reducing part 1201 for reducing transmission power of the transmission signal, a priority information control part 1206, a priority information storing part 1207 which is a memory for example, a power amplifier 1108 and an antenna 1109. The power reducing part 1201 includes a baseband signal storing part 1202 including at least a memory, a power reducing control part 1203 for controlling signal processing in the power reducing part 1201, a baseband signal multiplexing part 1204 for multiplexing input signals, an over-input detection part 1205, and a weight processing part 1208 for performing weight processing on the basis of priorities set for transmission signal of each call.

The baseband signal storing part 1202 includes at least a memory, and stores baseband signal of each call on which baseband signal processing and TPC processing were performed, and outputs the stored data to the power reducing control part 1203 according to a request of the power reducing control part.

The power reducing control part 1203 controls each part in the power reducing part 1201. And, the power reducing control part 1203 outputs baseband signals of each call stored in the baseband signal storing part 1202 to the baseband signal multiplexing part 1204 or to the weight processing part 1208 according to a control signal from the over-input detection part 1205. In addition, the power reducing control part 1203 obtains priority information from the priority information control part 1203 by requesting priority information to the priority information control part 1206, and obtains information on degree of over-input from the over-input detection part 1205, calculates weight coefficients from the priority information and the over-input degree information, and outputs the calculated weight coefficients to the weight processing part 1208. In addition, the power reducing control part changes output destination of the baseband signal multiplexing part 1204 according to control signal from the over-input detection part 1205.

The baseband signal multiplexing part 1204 multiplexes input signals. In addition, the baseband signal multiplexing part 1204 switches output destination between the over-input detection part 1205 and the power amplifier 1108 according to the control signal from the power reducing control part 203.

The over-input detection part 1205 judges whether the transmission signals multiplexed by the baseband multiplexing part 1204 becomes over-input. That is, the over-input detection part 1205 judges whether amplitude of the input transmission signal exceeds an allowable input value of the power amplifier 1108. When the allowable input value is not exceeded, the over-input detection part 1205 outputs the transmission signal to the power amplifier 1108. When the allowable input value is exceeded, the over-input detection part 1205 sends information that over-input is detected and the degree (difference from the allowable input value).

The priority information control part 1206 obtains information on priority determined for each call on the basis of circuit type and circuit characteristics of each channel from the outside of the apparatus, for example, a wireless network control station, and stores the priory information in the priority information storing part 1207. In addition, the priority information control part 1206 reads priority information from the priority information storing part 1207 according to a request from the power reducing control part 1203, and outputs the priority information to the power reducing control part 1203.

The weight processing part 1208 performs weight processing on an input transmission signal of a call by using weight coefficient for the call provided from the power reducing control part 1203 for each call, and outputs the signal to the baseband signal multiplexing part 1204.

Next, a transmission power reducing method of this embodiment will be described by using FIG. 20.

Transmission signals of each call on which baseband process was performed by the baseband signal processing parts 1101 and TPC process was performed by the transmission power control parts 1102 are once stored in the baseband signal storing part 1202. The transmission signals are read by the power reducing control part 1203, and are output to the baseband signal multiplexing part 1204 without weight processing in step 1301. In this case, the transmission signals are not output to the weight processing part 1208. In addition, the output destination of the baseband signal multiplexing part 1204 is set to the over-input detection part 1205 by the control signal from the power reducing control part 1203.

Next, the transmission signals on which weight processing is not performed are multiplexed by the baseband signal multiplexing part 1204, and are output to the over-input detection part in step 1302.

Next, it is judged whether the multiplexed transmission signal is in an over-input state by the over-input detection part 1205 in step 1303. When over-input is not detected, the multiplexed transmission signal is output to the power amplifier 1108 in step 1308, and the process on the transmission signal ends without performing power reduction.

When over-input is detected in step 1303, the fact that over-input is detected and the degree is sent to the power reducing control part 1203 by the over-input detection part 1205. In addition, the input signal which is the subject of the detection is discarded and is not output to the power amplifier 1108.

The over-input is notified to the power reducing control part 1203, priority information for each call is read from the priority information storing part 1207 by the priority information control part 1206 according to a request from the power reduction control part 1203, and is output to the power reduction control part 1203 in step 1304.

Next, the power reducing control part 1203 calculates weight coefficients for each call from the priority information and the degree of the over-input sent from the over-input detection part 1205 in step 1305. The weight coefficients are used for weight processing performed such that the transmission power does not become over-input. This calculation process is described later in detail.

When the weight coefficients are calculated, the transmission signals from which over-input was detected are read again from the base band signal storing part 1202 by the power reducing control part 1203, and are output to the weight processing part 1208. In this case, the transmission signals are not output to the baseband signal multiplexing part 1204. In addition, weight coefficients of each call calculated in step 1305 are output from the power reducing control part 1203 to the weight processing part 1208. In addition, output destination of the baseband signal multiplexing part 1204 is set to the power amplifier 1108 by the control signal from the power reducing control part 1203. In addition, the power reducing control part 1203 discards data of transmission signals stored in the baseband signal storing part 1202 such that the storing part 1202 can store next data. Then, the weight processing part 1208 performs weight processing on the transmission signals by using the calculated weight coefficients in step 1306. As a result, individual transmission power reducing is realized.

The transmission signals on which weight processing is performed are output to the baseband signal multiplexing part 1204 and are multiplexed in step 1307, and the multiplexed signal is output to the amplifier in step 1308. Then, the process ends.

Next, a determining algorithm (corresponding to step 1304 and step 1305 in FIG. 20) of the weight coefficients used in the power reducing control part 1203 will be described by using FIG. 21. According to this algorithm, weight coefficients are determined such that higher priority is assigned to a call for which degradation of communication quality should be avoided and transmission power is reduced from a call in order of increasing priority when the transmission power should be reduced (when over-input occurs).

A call having high priority is a call of a circuit type having low tolerance to error which is, for example, voice communication of circuit switching type which requires real-time processing and strict allowable delay. In addition, a call having low priority is a call of a circuit type having relatively strong tolerance to error which is, for example, data communication of packet switching type allowing relatively large delay since a correction means such as retransmission request is provided.

When over-input is detected by the over-input detection part 1205 and this detection is notified to the power reducing control part 1203, the reducing algorithm starts in the power reducing control part 1203.

The power reduction control part 1203 reads transmission signals from which over-input is detected from the baseband signal storing part 1202 and power values of each call (amplitude of each call) is obtained from the transmission signals. Further, priority information of each call is obtained from the priority information control part 1206. Then, the power reducing control part 1203 generates a table on the priority and the power value for each call in step 1401.

Next, data in the table generated in step 1401 is rearranged by using priority as a key in step 1402, a priority of a call (which is not limited to one call) having the lowest priority at this time is determined as a priority (which will be called "priority Pri" in the following) which indicates a subject to be decreased.

Next, on the basis of information on the degree of over-input sent from the over-input detection part 1205, a power reduction object value $P_{obj}$ is calculated in step 1404. The power reduction object value indicates a value which needs to be subtracted from the transmission power of the transmission signals for reducing the transmission power below the maximum allowable value of the transmission amplifier.

Next, a reduced power amount is calculated for a case when transmission power of every call having the priority Pri is reduced to the minimum power value which keeps the synchronization, and it is judged whether the reduced power amount reaches the power reduction object value $P_{obj}$ in step 1405.

When the reduced power amount reaches the power reduction object value $P_{obj}$ according to the judgement in step 1405, it is known that only transmission signals of calls having the priority Pri at this time become the subject of the transmission power reduction. Therefore, the power reduction control part 1203 determines weight coefficients such that transmission power of each call having the priority Pri is decreased in an equal ratio which is proportional to power value of each call such that the total decreased value becomes the power reduction object value in step 1408.

When the reduced power amount does not reach the power reduction object value $P_{obj}$ according to the judgement in step 1405, transmission power of every call having the priority Pri at the time is set to the minimum power value which keeps the synchronization, and the table is updated in step 1406. Then, after updating the table, priority Pri is released for the calls in which the power value is set to be the minimum value, and a new priority Pri is set as a value of a priority which is one stage higher than a priority which is originally assigned to the calls in which the priority Pri is released in step 1407. Then, the power reduction object value $P_{obj}$ is calculated again in step 1404. The processes in steps 1404–1407 are repeated until the judgment result in step 1405 reaches the power reduction object value $P_{obj}$.

The above-mentioned algorithm is an example in the transmission power reducing method of this embodiment, and the algorithm is not limited to the above-mentioned processes. For example, when priorities of a plurality of stages become the subject to be decreased, as mentioned above, it is possible that transmission power of calls having the highest level priority among calls of the subject to be decreased is reduced in an equal reduction ratio, and a call having a priority other the highest level priority is reduced to the minimum value. In addition, it is also possible that the transmission power is reduced by using a ratio in which the lower the priority is, the higher the ratio is according to the stages of the priority.

In the above-mentioned example, although a case has been described in which transmission power of a call having the priority Pri is reduced to the minimum power value which keeps the synchronization, it is possible that the transmission power is reduced to zero. That is, when it is required to absolutely keep communication quality having high priority when transmission power capacity of a base station remains very small, the transmission power is reduced to zero in the increasing order of the priority. That is, an algorithm for disconnecting circuits of low priority can be taken.

In any of the processing methods, by reducing the transmission power in order of ascending priority as this embodiment, calls having high priority do not receive effects of transmission power reduction so that communication quality does not deteriorate. In addition, it is clear that any number of levels of the priority can be set.

Figure 6:
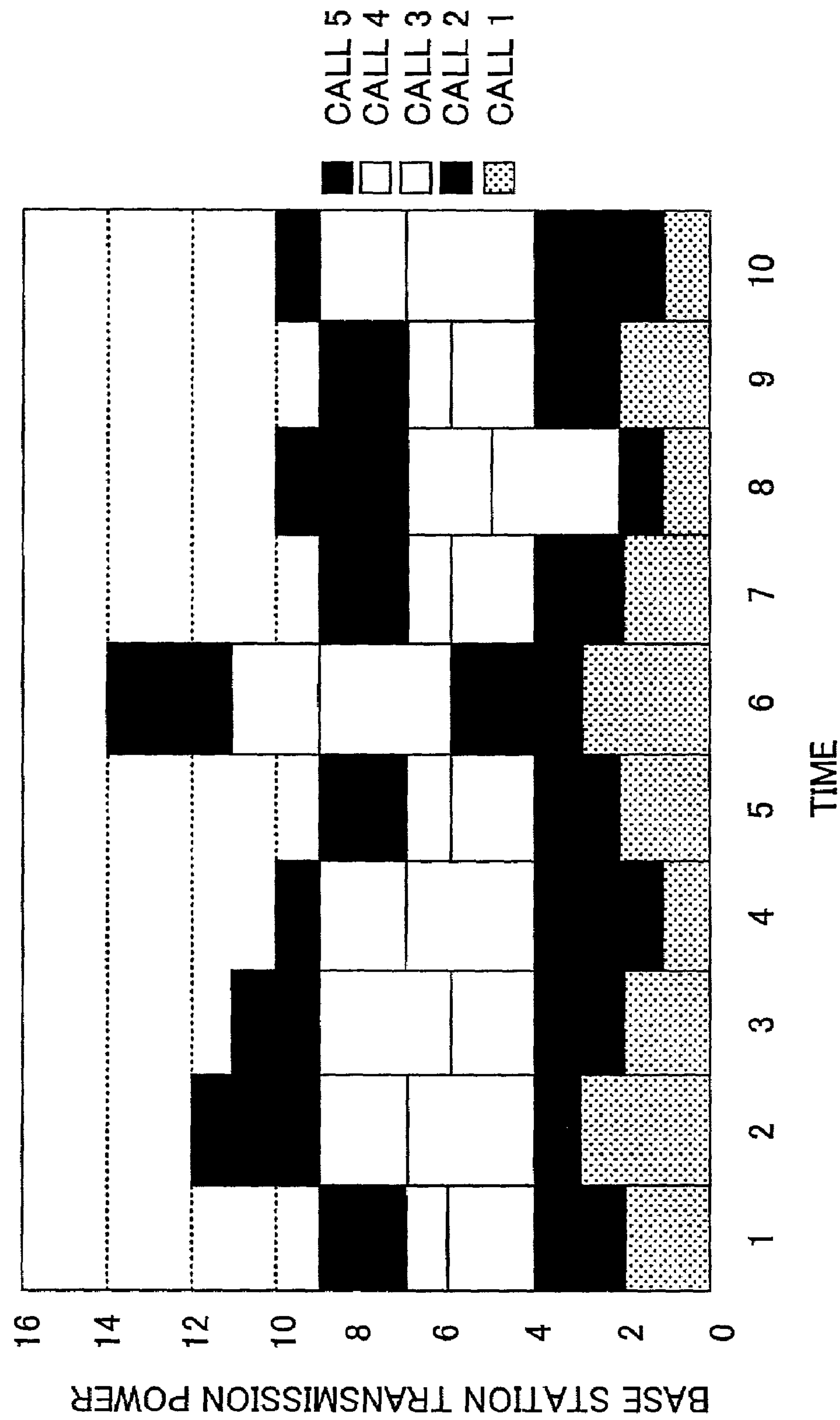
FIG. 6 shows a schematic graph for a case when transmission power reducing is not performed for transmission power of the base station.
Figure 7:
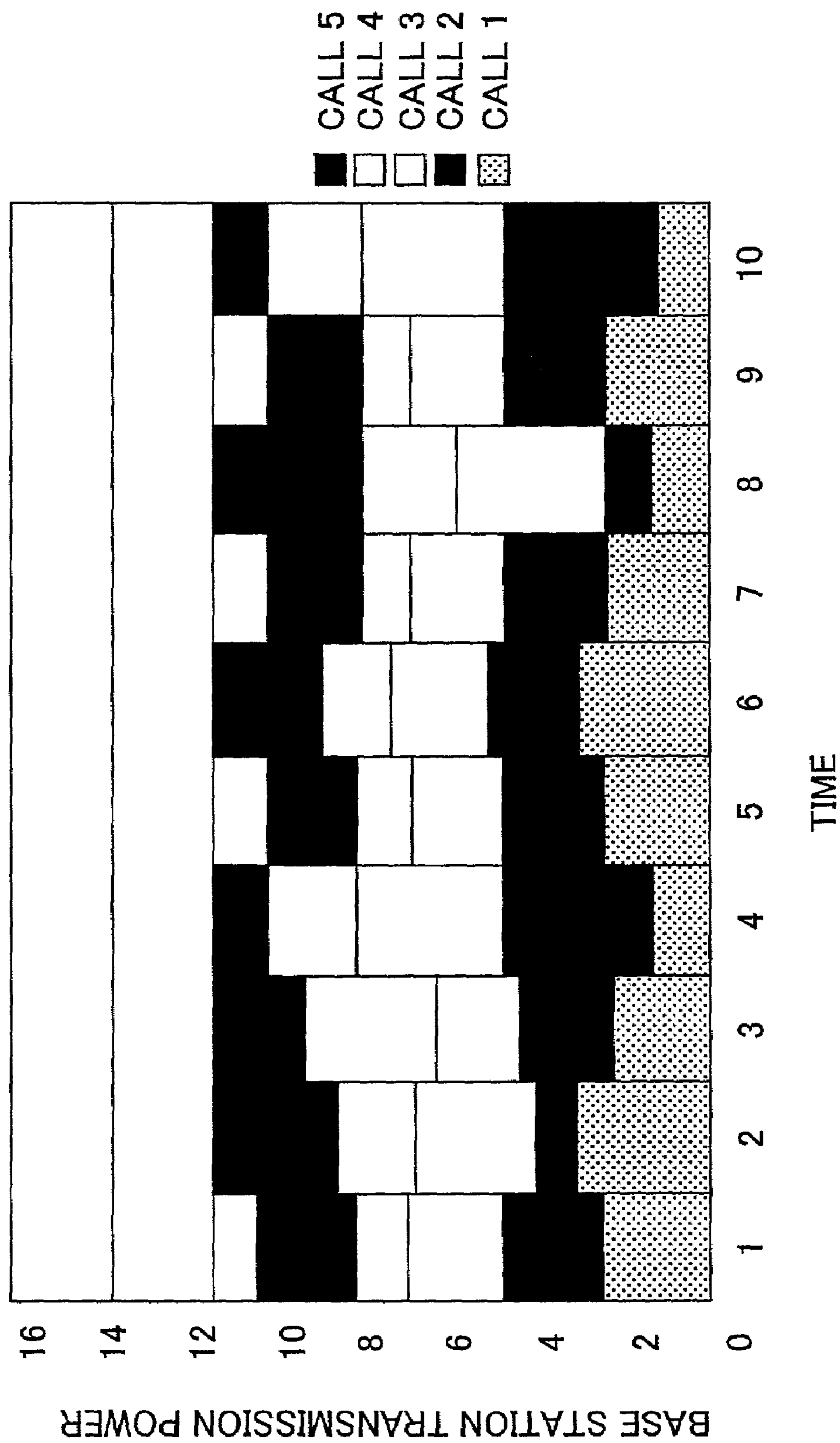
FIG. 7 shows a schematic graph for a case when the transmission power reducing is performed by the conventional apparatus.

An example of a process result of the transmission power reducing method of this embodiment is shown in FIG. 22. FIG. 22 is a graph schematically showing a case in which transmission power reduction process is performed by the transmission power control apparatus 1200. The condition of this example is the same as that of FIG. 6, in which signals are transmitted for calls 1–5, and it is assumed that the maximum allowable transmission power value of the base station is 10 on the vertical axis of the graph, and the transmission power exceeds at times 2, 3 and 6.

In addition, in FIG. 22, priority of a call 1 is the highest, and the priority of call 5 is the lowest, and priorities of calls 2–4 are the same.

In this condition, as shown in FIG. 22, at the times of 2 and 3, by reducing only the transmission power of the call 5, whole transmission power falls within 10. At the time of 6, the whole transmission power does not fall within 10 only by reducing the transmission power of call 5. In this case, the transmission power of call 5 is set to the minimum value, and, in addition, the transmission powers of calls 2–4 having low priority are reduced equally. In any time, the transmission power of the call 1 which has the highest priority is constant in which the transmission power of the call 1 is unaffected by the transmission power reduction. That is, communication quality is kept.

In the above-mentioned embodiments, the transmission power control apparatus is not necessarily included in the base station. The transmission power control apparatus can be provided anywhere in the system as long as the transmission power control apparatus controls the transmission power of the base station in the wireless communications system.

In addition, the present invention is not limited to the above-mentioned CDMA. The present invention can also be applied to a case where a technology called common amplifying for combining and amplifying a plurality of signals sent by different wireless frequencies is applied in FDMA (frequency division multiple access) and TDMA (time division multiple access).

As mentioned above, according to the present invention, since it can be prevented that the effect of transmission power reduction is exerted on every call, communication quality of the whole system improves. That is, it can be prevented that communication quality of calls which does not allow delay is deteriorated due to transmission power reduction.

The present invention is not limited to the specifically disclosed embodiments, and variations and modifications may be made without departing from the scope of the invention.

What is claimed is:

1. A transmission power control apparatus for a wireless communication apparatus for reducing a power value of a signal input to a power amplifier to the maximum allowable, input power value of said power amplifier or below, said transmission power control apparatus comprising:

a setting part for setting a transmission power upper limit value of a call according to a circuit type of said call, wherein the circuit type includes a packet switching type and a circuit switching type, said transmission power upper limit value comprising a first transmission power upper limit value and a second transmission power upper limit value, wherein the first transmission power upper limit value corresponds to the packet switching type call and the second transmission power upper limit value corresponds to the circuit switching type call, wherein the first transmission power upper limit value is lower than the second transmission power upper limit value; and a power reducing part for reducing transmission power for said call to or below said transmission power upper limit value depending on said call type, wherein, said setting part reduces said first upper limit value by a first predetermined ratio when said over-input to said power amplifier occurs, and said setting part increases said first upper limit value by a second predetermined ratio which is lower than said first predetermined ratio when said over-input to said power amplifier does not occur.

2. The transmission power control apparatus as claimed in claim 1, wherein said setting part sets said first transmission power upper limit value according to a degree of delay and a degree of bit-error rate (BER) which can be allowed for said circuit switching type.

3. The transmission power control apparatus as claimed in claim 1, wherein said setting part monitors occurrence of over-input to said power amplifier, and sets another transmission power upper limit value when said over-input occurs.

4. The transmission power control apparatus as claimed in claim 1, wherein said setting part monitors occurrence of call loss, and sets another transmission power upper limit value when said call loss occurs.

5. The transmission power control apparatus as claimed in claim 1, wherein said transmission power control apparatus is provided in a base station of a wireless communication system.

6. The transmission power control apparatus as claimed in claim 1, wherein said setting part adaptively sets said second transmission power upper limit value according to a degree of delay and a degree of bit-error rate (BER).

7. The transmission power control apparatus as claimed in claim 1, wherein said setting part sets said second transmission power upper limit value according to a degree of delay and a degree of bit-error rate (BER) which can be allowed for said packet switching type.

8. A transmission power control apparatus for a wireless communication apparatus for reducing a power value of a signal input to a power amplifier to the maximum allowable input power value of said power amplifier or below, said transmission power control apparatus comprising:

a SIR determining part for determining a control target SIR value of a call according to a circuit type of said call, wherein the circuit type includes a packet switching type and a circuit switching type, said control target SIR value comprising a first control target SIR value and a second control target SIR value, said first and second control target SIR values corresponding to said circuit type;

a target SIR setting part for setting a first control target SIR value for a packet switching type call and a second control target SIR for a circuit switching type call, wherein the first control target SIR value is lower than the second control target value; and a target SIR sending part for sending the first control target SIR value and a second control target SIR value to a communication station, wherein, said SIR determining part reduces said first control target SIR by a first predetermined ratio when over-input to said power amplifier occurs, and said SIR detenning part increases said first control target SIR by a second predetermined ratio which is lower than said first predetermined ratio when said over-input to said power amplifier does not occur.

9. The transmission power control apparatus as claimed in claim 8, wherein said SIR determining part sets said first control target SIR according to a degree of delay, and a degree of bit-error rate (BER) which can be allowed for said circuit switching type.

10. The transmission power control apparatus as claimed in claim 8, wherein said SIR determining part monitors occurrence of over-input to said power amplifier, and sets another control target SIR when said over-input occurs.

11. The transmission power control apparatus as claimed in claim 8, wherein said SIR determining part monitors occurrence of over-input to said power amplifier, and sets another control target SIR when said over-input occurs.

12. The transmission power control apparatus as claimed in claim 8, wherein said SIR determining part monitors occurrence of call loss, and sets another control target SIR when said call loss occurs.

13. The transmission power control apparatus as claimed in claim 8, wherein said transmission power control apparatus is provided in a base station of a wireless communication system.

14. A mobile station for communicating with a base station, said base station comprising:

a part for comparing a received SIR with a target SIR which is stored in said base station, and sending transmission power control information to said base station according to the comparing result;

a part for receiving a control target SIR from said base station, and setting said control target SIR as a new target SIR to be compared with said received SIR;

wherein said base station includes a transmission power control apparatus for reducing a power value of a signal input to a power amplifier to the maximum allowable input power value of said power amplifier or below, said transmission power control apparatus comprising:

a SIR determining part for determining a control target SIR value of a call according to a circuit type of said call, wherein the circuit type includes a packet switching type and a circuit switching type, said control target SIR value comprising a first control target SIR value and a second control target SIR value, said first and second control target SIR values corresponding to said circuit type;

a target SIR setting part for setting a first control target SIR value for a packet switching type call and a second control target SIR for a circuit switching type call, wherein the first control target SIR value is lower than the second control target value; and a target SIR sending part for sending the first control target SIR value and a second control target SIR value to a communication station, wherein, said SIR determining part reduces said first control target SIR by a first predetermined ratio when over-input to said power amplifier occurs, and said SIR determining part increases said first control target SIR by a second predetermined ratio which is lower than said first predetermined ratio when said over-input to said power amplifier does not occur.

15. A transmission power control method used for a wireless communication apparatus for reducing a power value of a signal input to a power amplifier to the maximum allowable input power value of said power amplifier or below, said transmission power control method comprising the steps of:

setting a transmission power upper limit value of a call according to a circuit type of said call, wherein the circuit type includes a packet switching type and a circuit switching type, said transmission power upper limit value comprising a first transmission power upper limit value and a second transmission power upper limit value, wherein the first transmission power upper limit value corresponds to the packet switching type call and the second transmission power upper limit value corresponds to the circuit switching type call, wherein the first transmission power upper limit value is lower than the second transmission power upper limit value; and reducing transmission power for said call to or below said transmission power upper limit value depending on said call type, the method further comprising the steps of:

reducing said first upper limit value by a first predetermined ratio when over-input to said power amplifier occurs;

increasing said first upper limit value by a second predetermined ratio which is lower than said first predetermined ratio when said over-input to said power amplifier does not occur.

16. The transmission power control method as claimed in claim 15, wherein said first transmission power upper limit value is set according to a degree of delay and a degree of bit-error rate (BER) which can be allowed for said circuit switching type.

17. The transmission power control method as claimed in claim 15, wherein another transmission power upper limit value is set when said over-input to said power amplifier occurs.

18. The transmission power control method as claimed in claim 15, wherein another transmission power upper limit value is set when over-input to said power amplifier occurs.

19. The transmission power control method as claimed in claim 15, wherein another transmission power upper limit value is set when call loss occurs.

20. The transmission power control method as claimed in claim 15, wherein said second transmission power upper limit value is set according to a degree of delay which can be allowed for said packet switching type.

21. A transmission power control method used for a wireless communication apparatus for reducing a power value of a signal input to a power amplifier to the maximum allowable input power value of said power amplifier or below, said transmission power control method comprising the steps of:

determining a control target SIR value of a call according to a circuit type of said call, wherein the circuit type includes a packet switching type and a circuit switching type, said control target SIR value comprising a first control target SIR value and a second control target SIR value, said first and second control target SIR values corresponding to said circuit type;

setting a first control target SIR value for a packet switching type call and a second control target SIR for a circuit switching type call, wherein the first control target SIR value is lower than the second control target value; and sending the first control target SIR value and a second control target SIR value to a communication station, the method further comprising the steps of:

reducing said first control target SIR by a first predetermined ratio when over-input to said power amplifier occurs;

increasing said first control target SIR by a second predetermined ratio which is lower than said first predetermined ratio when said over-input to said power amplifier does not occur.

22. The transmission power control method as claimed in claim 21, wherein said first control target SIR is set according to a degree of delay and a degree of bit-error rate (BER) which can be allowed for said circuit switching type.

23. The transmission power control method as claimed in claim 22, wherein another control target SIR is set when over-input to said power amplifier occurs.

24. The transmission power control method as claimed in claim 21, wherein another control target SIR is set when over-input to said power amplifier occurs.

25. The transmission power control method as claimed in claim 21, wherein another control target SIR is set when call loss occurs.

26. The transmission power control method as claimed in claim 21, wherein said second control target SIR is set according to a degree of delay and a degree of bit-error rate (BER) which can be allowed for said packet switching type.

27. A transmission power control apparatus for a wireless communication apparatus for reducing a power value of a signal of calls input to a power amplifier to the maximum allowable input power value of said power amplifier or below, said transmission power control apparatus comprising:

a classifying part for classifying calls into a circuit switching type group and a packet switching type group;

a power setting part for setting a first transmission power upper limit value of said circuit switching type group and a second transmission power upper limit value of said packet switching type group, wherein the second transmission power upper limit value is lower than the first transmission power upper limit value; and a power reducing part operable to reduce a power value individually for each group such that a power value of said calls is equal to or below the maximum allowable input value of said power amplifier, wherein said classifying part assigns priority for each call such that the larger a degree of delay which is allowed by said call is, the lower said priority is, and, said power reducing part reduces each power value of a part of calls in ascending order of said priority such that a power value of calls input to said power amplifier is equal to or below the maximum allowable input power value of said power amplifier.

28. The transmission power control apparatus as claimed in claim 27, wherein said classifying part classifies said calls according to degree of delay and degree of bit-error rate (BER) which is allowed by a circuit type of each call.

29. The transmission power control apparatus as claimed in claim 27, wherein said power reducing part reduces only a power value of a group of said packet switching type.

30. The transmission power control apparatus as claimed in claim 27, wherein the number of said plurality of groups and said upper limit value for each group are changed according to types of said calls.

31. The transmission power control apparatus as claimed in claim 27, wherein said classifying part assigns priority for each call according to circuit characteristics of said each call, and said power reducing part reduces a power value of a call according to said priority.

32. The transmission power control apparatus as claimed in claim 27, wherein said power reducing part does not reduce a power value of a call which has priority within predetermined levels from the highest priority.

33. A transmission power control method used for a wireless communication apparatus for reducing a power value of a signal of calls input to a power amplifier to the maximum allowable input power value of said power amplifier or below, said transmission power control method comprising the steps of:

classifying calls into a circuit switching type group and a packet switching type group;

setting a first transmission power upper limit value of said circuit switching type group and a second transmission power upper limit value of said packet switching type group, wherein the second transmission power upper limit value is lower than the first transmission power upper limit value; and reducing a power value individually for each group such that a power value of said calls is equal to or below the maximum allowable input value of said power amplifier, the method further comprising the steps of:

assigning priority for each call such that the larger a degree of delay which is allowed by said call is, the lower said priority is; and reducing each power value of a part of calls in ascending order of said priority such that a power value of calls input to said power amplifier is equal to or below the maximum allowable input power value to said power amplifier.

34. The transmission power control method as claimed in claim 33, wherein said calls are classified according to degree of delay and a degree of bit-error rate (BER) which is allowed by a circuit type of each call.

35. The transmission power control method as claimed in claim 33, wherein only a power value of a group of said packet switching type is reduced.

36. The transmission power control method as claimed in claim 33, wherein the number of said plurality of groups and said upper limit value for each group are changed according to types of said calls.

37. The transmission power control method as claimed in claim 33, comprising the steps of:

assigning priority for each call according to circuit characteristics of said call; and reducing a power value of a call according to said priority.

38. The transmission power control method as claimed in claim 33, wherein a power value of a call which has priority within predetermined levels from the highest priority is not reduced.

39. The transmission power control method as claimed in claim 37, comprising the steps of:

assigning said priority such that the larger a degree of delay which can be allowed by said call, the lower said priority is;

determining at least a power reduction subject call from a call having the lowest priority in ascending order of priority such that a power value of calls input to said power amplifier becomes equal to or below said maximum allowable input power value if it is assumed that each power value of said at least a power reduction subject call is reduced to a minimum power value which can maintain synchronization;

reducing each power value of calls in said at least a power reduction subject call other than calls having the highest priority in said at least a power reduction subject call to a minimum power value which can maintain synchronization; and reducing each power value of calls having the highest priority in said at least a power reduction subject call evenly by a predetermined ratio such that a power value of calls input to said power amplifier becomes equal to or below said maximum allowable input power value.

* * * * *